(12) United States Patent
Trandal et al.

(10) Patent No.: US 8,296,259 B1
(45) Date of Patent: *Oct. 23, 2012

(54) METHODS AND SYSTEMS FOR INVENTORY MANAGEMENT

(76) Inventors: David Scott Trandal, Santa Barbara, CA (US); David J. Brahm, The Woodlands, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/359,357

(22) Filed: Jan. 26, 2012

Related U.S. Application Data

(63) Continuation of application No. 13/093,313, filed on Apr. 25, 2011, now Pat. No. 8,135,726, which is a continuation of application No. 13/008,320, filed on Jan. 18, 2011, now Pat. No. 7,962,485, which is a continuation of application No. 12/109,745, filed on Apr. 25, 2008, now Pat. No. 7,899,823.

(51) Int. Cl.
*G06F 7/00* (2006.01)

(52) U.S. Cl. .................................................. 707/603

(58) Field of Classification Search ............... 707/603
See application file for complete search history.

(56) References Cited

U.S. PATENT DOCUMENTS

| | | | |
|---|---|---|---|
| 5,393,965 A | 2/1995 | Bravman et al. |
| 5,646,389 A | 7/1997 | Bravman et al. |
| 6,434,530 B1 | 8/2002 | Sloane et al. |
| 6,564,261 B1 | 5/2003 | Gudjonsson et al. |
| 6,912,507 B1 | 6/2005 | Phillips et al. |
| 6,938,002 B2 | 8/2005 | Moskowitz |
| 6,950,646 B2 | 9/2005 | Pradhan et al. |
| 6,968,178 B2 | 11/2005 | Pradhan et al. |
| 6,993,507 B2 | 1/2006 | Meyer et al. |
| 7,069,240 B2 | 6/2006 | Spero et al. |
| 7,214,891 B1 | 5/2007 | Hewitt et al. |
| 7,231,416 B1 | 6/2007 | Busuioc |
| 7,249,708 B2 | 7/2007 | McConnell et al. |
| 7,302,270 B1 | 11/2007 | Day |
| 7,552,087 B2 | 6/2009 | Schultz |
| 7,742,989 B2 | 6/2010 | Schultz |
| 7,792,709 B1 | 9/2010 | Trandal et al. |
| 7,899,823 B1 | 3/2011 | Trandal et al. |
| 7,962,485 B1 | 6/2011 | Trandal et al. |
| 2001/0051884 A1 | 12/2001 | Wallis et al. |
| 2001/0056359 A1 | 12/2001 | Abreu |
| 2002/0116254 A1* | 8/2002 | Stein et al. ................. 705/11 |
| 2002/0128967 A1 | 9/2002 | Meyer et al. |
| 2002/0188561 A1 | 12/2002 | Schultz |
| 2003/0055727 A1 | 3/2003 | Walker et al. |
| 2003/0061104 A1 | 3/2003 | Thomson et al. |
| 2004/0088263 A1 | 5/2004 | Miller et al. |
| 2004/0117239 A1 | 6/2004 | Mittal et al. |
| 2004/0172260 A1 | 9/2004 | Junger et al. |
| 2004/0251305 A1 | 12/2004 | Klapka et al. |
| 2005/0049928 A1 | 3/2005 | Naick et al. |
| 2005/0075928 A1 | 4/2005 | Ariely |

(Continued)

OTHER PUBLICATIONS

Article: Barlyn, Suzanne; "Quick Fix, Making a Home Inventory"; Wall Street Journal, Date Unknown.

(Continued)

*Primary Examiner* — Truong Vo

(57) ABSTRACT

The present invention relates to inventory management solutions, and in particular, to methods and systems for inventorying items over wireless and data networks, using digital imaging, positioning, and data terminals. The user experience in performing inventory management is simplified and enhanced over existing methods.

21 Claims, 23 Drawing Sheets

U.S. PATENT DOCUMENTS

| | | | |
|---|---|---|---|
| 2006/0069730 | A1 | 3/2006 | Azuma |
| 2006/0100925 | A1 | 5/2006 | Finaly |
| 2006/0282342 | A1* | 12/2006 | Chapman ........................ 705/28 |
| 2007/0050258 | A1 | 3/2007 | Dohse |
| 2007/0112656 | A1 | 5/2007 | Howe et al. |
| 2007/0265914 | A1 | 11/2007 | McClung |
| 2007/0287488 | A1 | 12/2007 | Faber et al. |
| 2007/0294096 | A1 | 12/2007 | Randall et al. |
| 2008/0028473 | A1 | 1/2008 | Cehelnik |
| 2008/0032688 | A1 | 2/2008 | Chew et al. |
| 2008/0066080 | A1 | 3/2008 | Campbell |
| 2008/0072064 | A1 | 3/2008 | Franchi |
| 2008/0089506 | A1 | 4/2008 | Pounds et al. |
| 2008/0194260 | A1 | 8/2008 | Alterberg et al. |
| 2008/0215961 | A1 | 9/2008 | Alterberg et al. |
| 2009/0285483 | A1 | 11/2009 | Guven et al. |
| 2010/0145754 | A1 | 6/2010 | Rahman |
| 2010/0306080 | A1 | 12/2010 | Trandal et al. |

OTHER PUBLICATIONS

Article: Sharma, Amol and Vascellaro, Jessica E.; "Phones Will Soon Tell Where You Are"; Wall Street Journal, Mar. 28, 2008.

Article: Holm, Erik; "How Am I Driving? Insurers May Know"; Wall Street Journal, Feb. 4, 2011.

Article: Ante, Spencer E.; "Venture Capitalist's New Frontier: Where Cellphones Meet Retailing"; Wall Street Journal, Jul. 16, 2010.

Unpublished U.S. Appl. No. 12/137,373, filed Jun. 11, 2008, Trandal, David S.; et al.

Unpublished U.S. Appl. No. 12/268,930, filed Nov. 11, 2008, Trandal, David S.; et al.

Unpublished U.S. Appl. No. 12/410,444, filed Mar. 24, 2009, Trandal, David S.; et al.

Unpublished U.S. Appl. No. 12/486,621, filed Jun. 17, 2009, Trandal, David S.; et al.

Unpublished U.S. Appl. No. 12/843,765, filed Jul. 26, 2010, Trandal, David S.; et al., Continuation of 7,792,709.

Unpublished U.S. Appl. No. 13/008,166, filed Jan. 18, 2011, Trandal, David S.; et al., Continuation of U.S. Appl. No. 12/137,373.

Unpublished U.S. Appl. No. 13/093,313, filed Apr. 25, 2011, Trandal, David S.; et al., Continuation of 7,962,485.

\* cited by examiner

Your Home Inventory
*Secure. Easy. FREE!*

*Products & Services  Contact Us  Help* http://www.HomeInventoryPersonalProperty.com

Current Customer Sign In:

New Customer Registration: — 5300

Name: Jane Jones — 5510

Mobile Number: 805-555-1212 — 5520

Password: ************ — 5530

Multi-Level Residence: ○ Yes  ● No — 5540 if yes, how many levels (not including the basement) — 5550

[Download Now] — 5560

METHODS AND SYSTEMS FOR INVENTORY MANAGEMENT

PRIORITY CLAIM

This application is a continuation of U.S. Application No. 13/093,313, filed Apr. 25, 2011, which is a continuation of U.S. Application No. 13/008,320, filed Jan. 18, 2011, which is now U.S. Pat. No. 7,962,485, which is a continuation of U.S. application Ser. No. 12/109,745, filed Apr. 25, 2008, which is now U.S. Pat. No. 7,899,823, all of which are incorporated herein by reference in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

FIELD OF THE INVENTION

The present invention relates to inventory management using digital imaging, wireless communications, and voice and data networks.

BACKGROUND OF THE INVENTION

Homeowners would find it useful to have an organized record of their belongings. This organized record can be used in the event of an emergency. For example, an organized list can be used to file an insurance claim in the event of a burglary or a fire. An organized list with appropriate beneficiary assignments can also be used in personal estate planning.

Getting homeowners (homeowners in this document includes renters) to create a list of their belongings, and keep it updated, is difficult. Conventionally, homeowners have relied upon a combination of paper lists, receipts, and their memory to recreate a comprehensive list of their personal property after a disaster. In some cases, particularly with the advent of digital photography, homeowners have captured images of the items or personal property in their homes. More recently, software programs have been introduced (e.g., Quicken's Home Inventory Manager) to facilitate the list capture and organization process.

Even with recent advances, homeowner inventory management continues to be tedious and time consuming. Consequently, very few homeowners create an inventory of their belongings.

SUMMARY OF THE INVENTION

Example embodiments listed simplify the data capture, organization, and secure storage of a personal property owner's list of belongings. In addition, embodiments are described facilitating the insurance claims process, reducing the cost to the insurance industry of claims management.

In addition, embodiments of the present invention provide methods and systems to enable a service provider to offer Home Inventory services that allow subscribers to store a collection of objects (e.g., photos and photo renditions). Certain methods and systems described herein provide for the creation of a rendition of a user's residence. These renditions are optionally used to organize objects/items of interest to the user and are readily accessible to the user from various devices over various networks. The data/objects are retained indefinitely (or for an extended or designated period of time) in a reliable, secure, and accessible database and/or data store. In an example embodiment, this is achieved with large redundant data farms with geographic separation, using Redundant Array of Independent/Inexpensive Disk (RAID) technology, distributed peer-to-peer redundant data storage and/or other techniques. These objects of interest to the user are optionally updated as the user makes new acquisitions, sells, donates, and/or disposes of their personal property.

Certain methods and systems described herein provide for the separation of items within an image in the context of a Home Inventory system. Separable items from an image can be categorized or labeled using computer assisted pattern recognition techniques (e.g., pattern matching a lamp against a stored dictionary of household items). The terms, "for example", "e.g.", "optionally", as used herein, are intended to be used to introduce non-limiting examples. Optionally, Home Inventory service provider personnel can enhance the separation and identification process by auditing the output from the recognizer and making any necessary corrections.

Assigning labels to items helps the subscriber organize and search their personal property. In addition, labels can be used to categorize item types and their value. Determining value of household items has certain advantages for the user as compared to only providing a list or an inventory of photos. For example, labeled items with underlying values can help a user determine if s/he is over or under insured.

BRIEF DESCRIPTION OF THE DRAWINGS

Example embodiments will now be described with reference to the drawings summarized below. These drawings and the associated description are provided to illustrate example embodiments of the invention, and not to limit the scope of the invention.

FIG. 5 illustrates an example user interface presented using a browser. The example interface enables a user to register a new account for a Home Inventory system.

DETAILED DESCRIPTION OF THE PRESENT INVENTION

Figure 1:
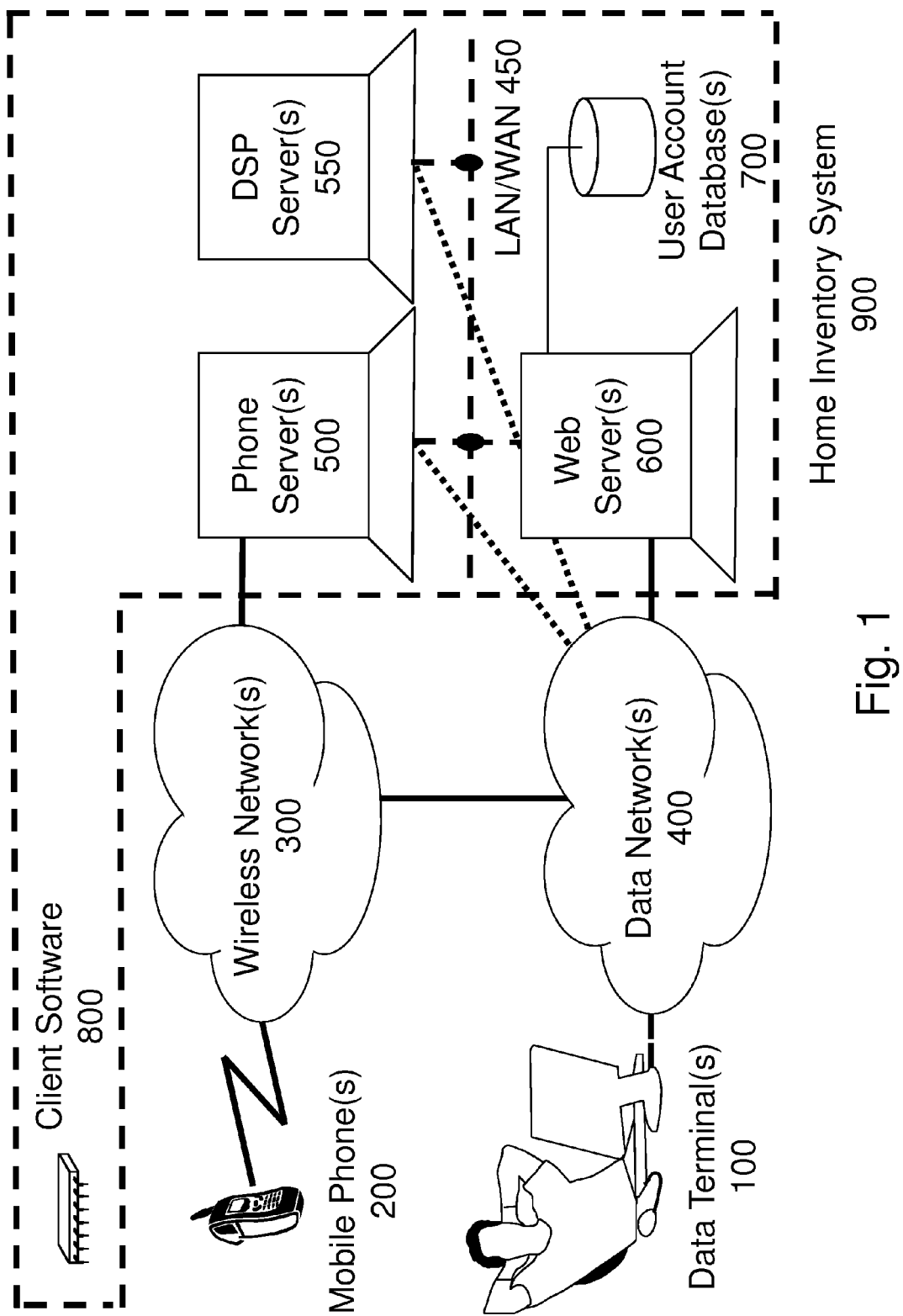
FIG. 1 illustrates an example network operating environment for a Home Inventory system.

The methods and systems of the present invention simplify and enhance home inventory data capture, organization, and secure storage.

Glossary

Homeowner—an individual or family who rents or owns a residence and owns personal property.

Web Site or Web is a term used throughout the following description. It is used to refer to a user-accessible network site that implements the basic World Wide Web standards for the coding and transmission of hypertext documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following descriptions relates to an embodiment utilizing the Internet and related protocols, other networks and other protocols may be used as well.

Phone Identifier—Further, while the following description refers to example networks and telephony standards and protocols, other standards and protocols can be used as well. The term phone Identifier (phone ID) can include a Session Initiation Protocal (SIP) address, a Skype address (or other peer-to-peer Internet telephony network address), a wireless phone number, an International number, an E.164 phone number, a tElephone Number Mapping (ENUM) address, a Mobile Equipment IDentifier (MEID), an International Mobile Equipment Identifier (IMEI), an Electronic Serial Number (ESN), or other telephony address. While certain phone identifiers are referenced for purposes of illustration, other electronic addresses or locators can be used as well.

Image—while the following refers to images or pictures of personal property, the term should not be limited to photographic images taken from a mobile device. Images include for example scanned images, facsimiles, video, digital camera images, and other optical image capture which can be used to photograph items and transmit the images or pictures electronically.

Rendition—A rendition is an alternate (usually simplified) view of original information. Examples include line drawings derived from photographs and floor plans created from lists of room GPS coordinates.

In addition, while references may be made to the use of a mobile phone as an image capture device, other electronic image capture devices, e.g., a digital camera can be used as well.

Unless otherwise indicated, the functions described herein may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a network-enabled personal digital assistant (PDA), a network game console, a networked entertainment device, a smart phone (e.g., with an operating system and on which a user can install applications) and so on. While certain references are made to certain example system components or services, other components and services can be used as well and/or the example components can be combined into fewer components and/or divided into further components.

In addition, while certain user inputs or gestures are described as being provided via phone key presses, data entry via a keyboard, or by clicking a computer mouse or button, optionally, user inputs can be provided using other techniques, such as by voice or otherwise. The example screen layouts, appearance, and terminology as depicted and described herein, are intended to be illustrative and exemplary, and in no way limit the scope of the invention as claimed.

Some or all of the information and functionality provided by the user interfaces discussed can be provided by a widget or a gadget. A widget can be in the form of portable code that can be installed and executed within a Web page (e.g. an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

The functionality, operation, and implementation for an example home inventory management service will now be described in further detail.

FIG. 1 illustrates an example Home Inventory system 900 that can be used in accordance with the present invention. As illustrated, the Home Inventory system includes a plurality of user mobile phones 200. The mobile phones 200 are connected to a wireless telephony and data network 300. Optionally, the mobile phones 200 are capable of receiving one or more software applications over a wireless network 300. Optionally, the mobile phones 200 are capable of taking pictures and these pictures can be downloaded over a wireless network 300 and/or data network 400 to a server 600. Optionally, web server 600 offloads image and speech processing to Digital Signal Processing (DSP) Servers 550 to assist in identifying items within pictures and with transcription of audio descriptions of items. Live operators can also serve to assist and/or replace the DSP servers 550 in carrying out these services.

As further illustrated, the Home Inventory system interacts with a plurality of computer terminals 100. The computer terminals 100 can be a personal computer having a monitor, keyboard, a disk drive, and a data communication interface. In addition, the computer terminal 100 can be an interactive television, a networked-enabled personal digital assistant (PDA) or the like. The computer terminals 100 are connected to a data network 400 (e.g., the Internet or a corporate LAN or WAN).

In an example embodiment, a downloadable, application software program 800 connects to and communicates with a phone server 500 and a web server 600 either directly via the wireless network 300 or indirectly by linking the wireless network 300 with the data network 400. The application program 800, executing on a subscriber's mobile phone 200 or other host, can interact with the optical scanning capabilities of the mobile phone to receive an image or the content of an image. Optionally, the application program 800 can be used to transmit data to the Home Inventory system 900 (e.g., by transmitting a message over the Internet). Optionally, the application program 800 can make the user's online presence known to the Home Inventory system 900 (e.g., by periodically transmitting a message over the Internet to the Home Inventory system 900). Optionally, the application program 800 can be used to receive and store in a computer readable medium a password from the user. For example, the user invokes the application (if the application is not already active) and enters a password (e.g., by key pressing or speaking a password). Optionally, the application program 800 can be used to receive and store in a computer readable medium a copy of a password from a Home Inventory service provider 600 that the user has previously registered with. For example, the Home Inventory system transmits a message over a wireless data connection to the application program 600 or via a Short Message Service (SMS). SMS is a wireless messaging service that enables the transmission of messages between mobile subscribers (and their phones) and external systems such as electronic mail services. Optionally, the application program 800 can display user instructions, status, success, and failure messages to the user. Optionally, the application program 800 provides a user interface through which a user can enter data and/or respond to messages. Optionally, the application programs functional capabilities can be integrated into and can be a part of another application (e.g., a telecommunications client or a contact management client).

The Home Inventory Servers 500, 550, and 600 are interconnected either through Data Network 400 (e.g. the public Internet—as depicted by the dotted line connections in FIG. 1) or via a private Local Area Network (LAN) or private Wide Area Network (WAN) 450—as shown by the dashed line connections in FIG. 1.

The Home Inventory system 900 in this example contains centralized databases and/or general-purpose storage area, optionally including, but not limited to, some or all of the following: a customer database 700, an image store, a dictionary of item image patterns and labels.

The Home Inventory system in this example contains a phone server subsystem 500 with call processing capabilities. These servers optionally provide interactive voice response, voice messaging, voice recognition, text-to-speech services and voice message transcription to natural-language text.

The Home Inventory system in this example contains a subsystem for creating a rendition of the user's residence. The subsystem receives a collection of locations and geographic data points (e.g., GPS coordinates) and optionally combines this with a database of other optional inputs (e.g. typical bedroom sizes, age of residence, city and county codes, user demographics, etc) to create floor plan renditions. These floor plan renditions can be used to help organize item/person property information received from the user.

The Home Inventory system in this example contains a subsystem for item recognition. The subsystem can perform pattern recognition by comparing items in an image against a database of item templates, and/or other techniques and/or algorithms (e.g., from simple Bayesian classifiers or more powerful neural networks). The subsystem includes various programs and/or devices including some or all of the following and/or additional and/or different programs and/or devices: a control program which submits photo images/files to an internal or independent device (e.g., a dedicated device including hardware and/or software) specialized for pattern recognition, and receives back a text file that consists of one or more labels/categorizations together with a set of values representing probability or confidence values relating to the item recognition and other features. Optionally, the item recognizer uses a different recognizer engine and/or item database/dictionary based on user specific characteristics including but not limited to: the geographic region of the user (e.g., determined from the user's mobile phone identifier and/or GPS coordinates); the location within a geographic region (e.g., city, rural, downtown); language; demographics, psychographics, etc. Optionally, the item recognizer can be personalized or tuned based on direct feedback from a user (e.g., user selecting a different name/label for an item) or indirect feedback (e.g., user item search requests). Optionally, the item recognizer can provide real-time and/or delayed feedback to the user regarding the quality of the image (e.g., to determine whether the user might need to retake one or more images) and whether the characteristics of the image environment need to be improved (e.g., enhanced lighting).

Optionally, the item recognizer can provide real-time feedback to the user regarding the items in an image. For example, a call can be placed to the user's mobile device 200 as s/he is taking pictures of a room and using text-to-speech play back a list of items, as recognized by the Home Inventory system, in the current room/location. Alternatively, a list of items can be downloaded from the Home Inventory system to the user's mobile device in near real-time for visual preview or text-to-speech playback from the handset. Optionally, the user can retake an image to improve the recognizer results. Alternatively, a user interface can optionally be provided (e.g., a screen-based user interface on the user's handset) to edit the real-time output produced by the recognizer (which optionally can be located on the user's handset or in a remote server connected over a wireless/data network).

In addition, the item recognizer may optionally use an underlying statistical model of the location of items in an image and/or the type of room (e.g. bathroom versus bedroom) to determine an identity of an item. For example, a picture is likely to be an item located in the upper half of an image whereas a rug would likely be in the lower portion of an image.

In addition, the item recognition system can pass the input image and associated output text file to a human for review for corrections and for improvements of accuracy. The Home Inventory system can further analyze the behavior of users when using or searching. The system may determine that users preferentially search or tend to search on particular items that represent important personal property (e.g., flat screen television). The system may use this information to prioritize the item identification of these items, to increase or decrease acceptable confidence levels, and/or to focus human review on these important aspects.

The Home Inventory system 900 optionally assists the user (or service provider personnel) by marking labels/names of items in the output whose identification is of low certainty or confidence. Low certainty can result from many sources including poor image lighting, items clumped together, items without a distinctive shape, etc.

In an example embodiment, the marking of low confidence/certainty is signaled to the user by a variety of textual modifications to the assigned label including, by way of example: inserting a qualifier such as "?" before (and/or after) the best label candidate; offering two or more candidate labels (e.g. picture/flat screen television); typographical modifications such as italics, color, highlighting, etc; and/or other indicators. Optionally, the number of low certainty labels may cause the output to be routed to humans for review and/or manual item recognition.

The user interfaces for access to the stored/archived information are optionally device specific. By way of example, the user interface for a computer may be provided via a widget/gadget, a more traditional web portal, and/or an executable client. For a handset, the interaction is optionally tailored to the available display space and interaction mechanism, where the functionality is similar although optionally reduced in scope. For example, for a handset, certain logos, menus, images, and the like can be reduced in relative size or eliminated.

The Home Inventory system 900 optionally includes a Customer Relationship Management (CRM) subsystem. The CRM engine can mine certain information with respect to a user associated with the usage of the Home Inventory system. For example, the Home Inventory system can promote certain insurance policies/companies based on the number of items, appraised value of the user's items, and/or location information. Another example, the Home Inventory system can detect the lack of a certain item and promote to the user those missing items.

Figure 2:
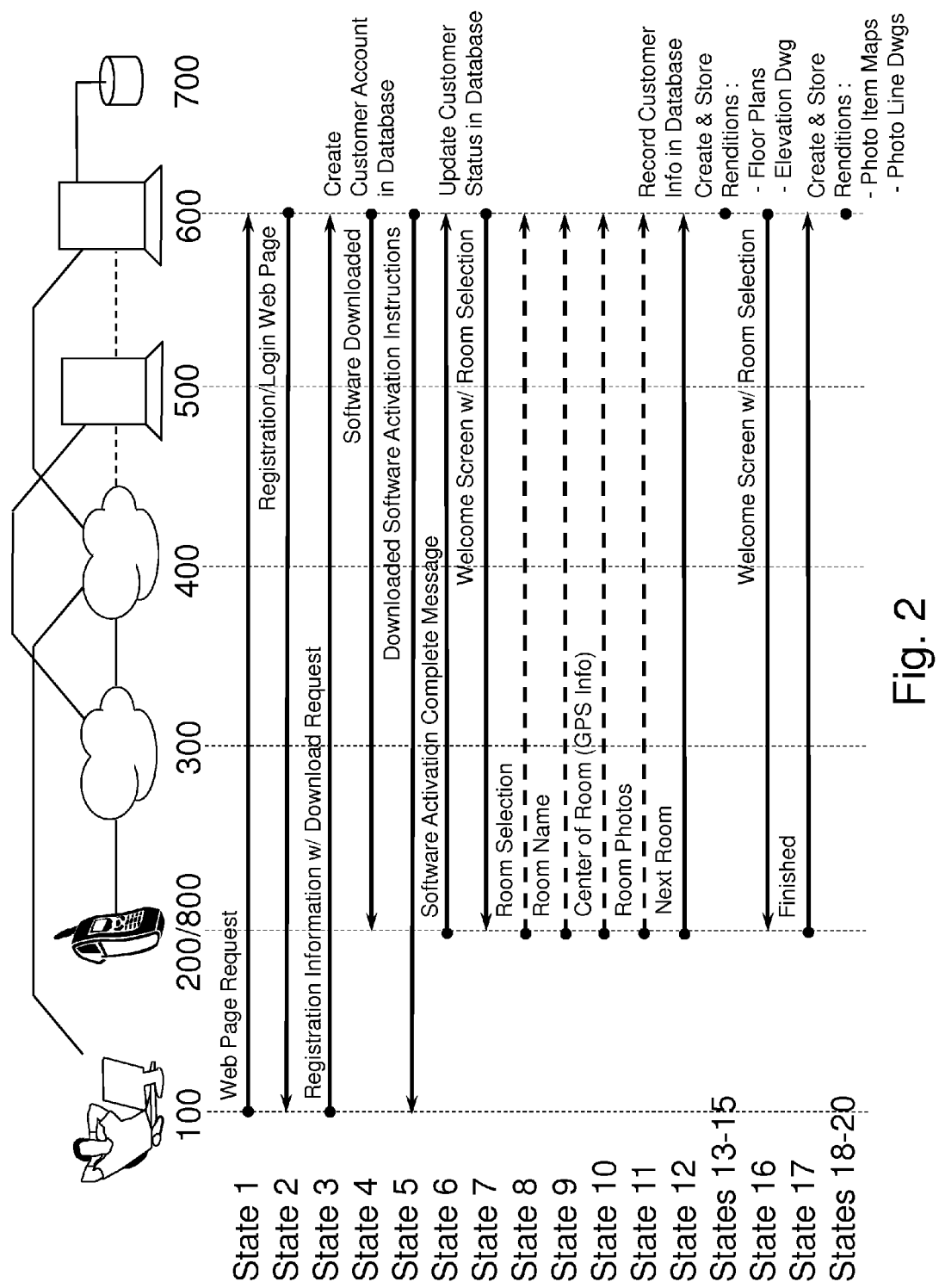
FIG. 2 illustrates an example operating environment/process for a Home Inventory system.
Figure 3:
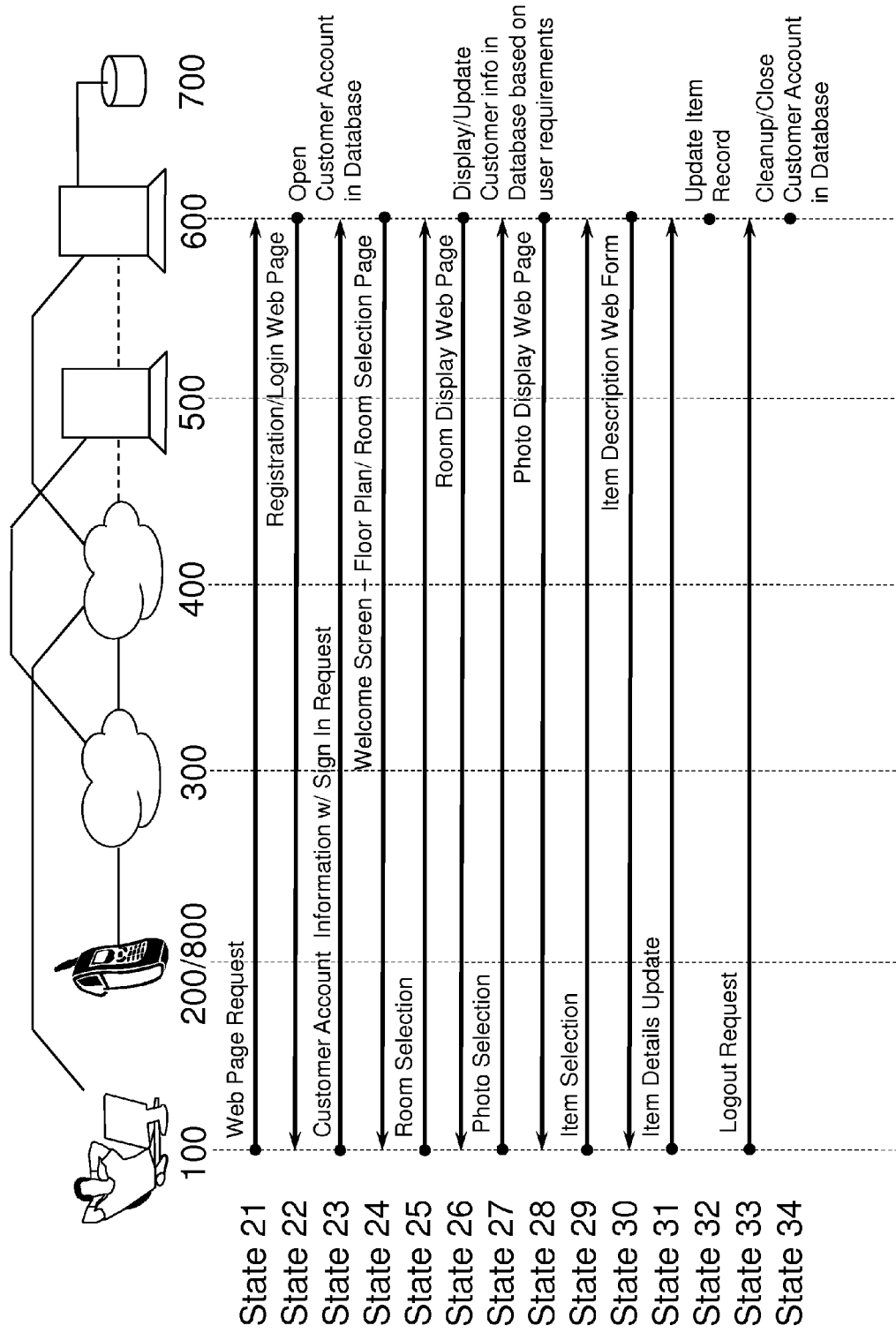
FIG. 3 illustrates a continuation of the example operating environment/process for a Home Inventory system.

FIGS. 2 and 3 illustrate an example workflow of a new user registration and software installation process and ongoing user operation of a Home Inventory system described in detail later in this document. Process states are listed on the left and major elements of the operating environment of FIG. 1 are listed across the top. Using solid lines with arrows to signify the direction of information flow, the diagram pictorially represents process flow and interactions between the elements in an example embodiment. Dashed lines depict optional information flow/interactions between the elements.

Figure 4:
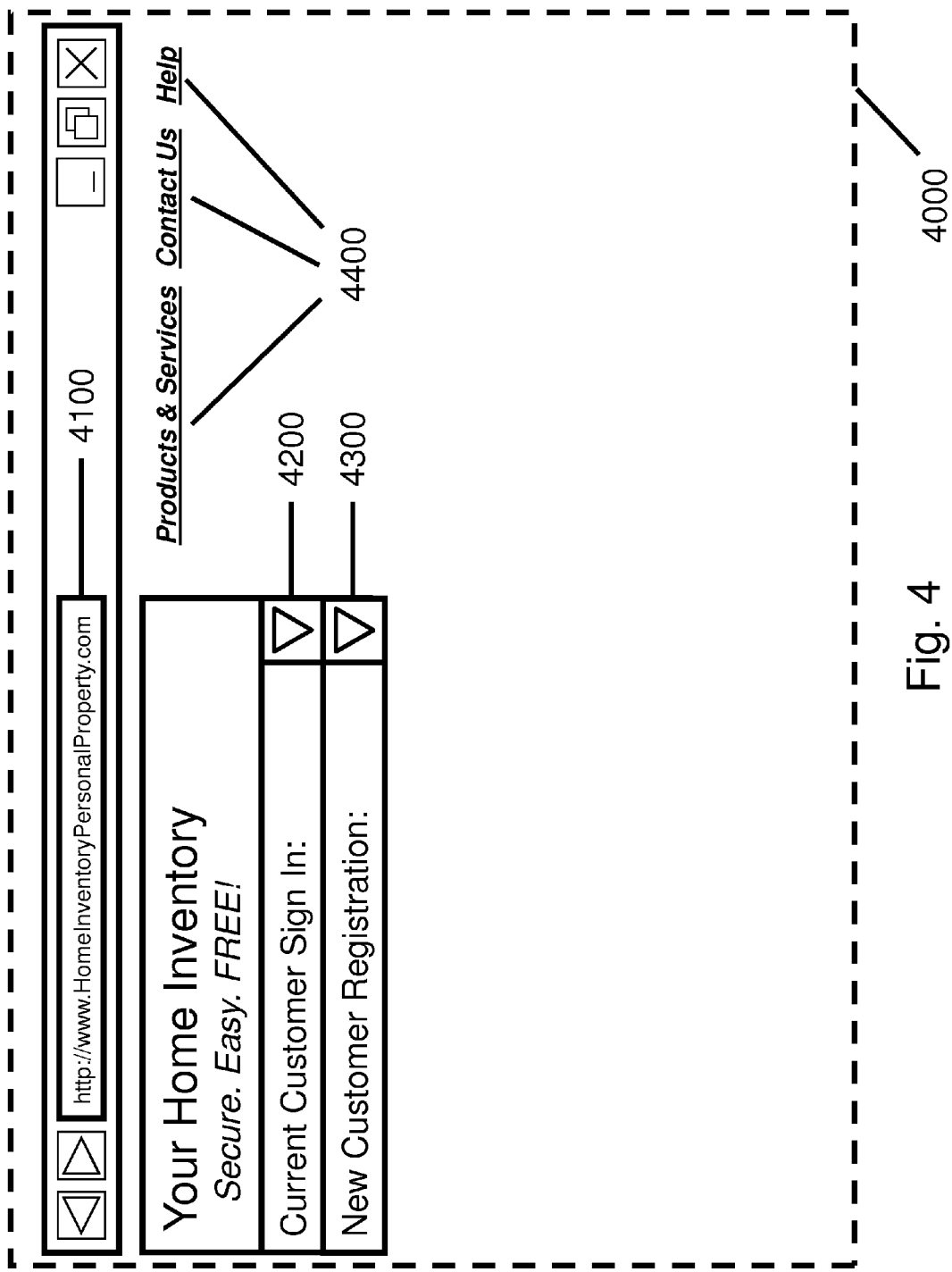
FIG. 4 illustrates an example user interface presented using a browser. The example interface enables a user to create/register a new account or to login to an existing account.

FIG. 4 illustrates an example Home Inventory system home page user interface 4000 presented via a browser (or other interface application) to a user. The browser can be, by way of example executing on a computer terminal 100, such as a personal computer, a Wireless Application Protocol (WAP) or browser-enabled phone, a PDA or the like. The web page can optionally be accessed by supplying the appropriate Uniform Resource Locator (URL) to the browser 4100, by selecting a link in response to a search query, or the like. The example user interface includes links for other information services 4400. The example user interface also includes a link for existing customers to login 4200 and a link for new customers to register 4300. Upon user selection of the New Customer Registration pull down menu link 4300, an additional menu pane 5500 is displayed. As illustrated in FIG. 5, this pane 5500 includes a name entry field 5510, a mobile phone number entry field 5520, a password entry field 5530, a yes or no radio button 5540 to specify if the residence has more than one level, and a number of residence levels field 5550 which becomes illuminated when the yes radio button 5540 has been specified. Lastly, the interface includes a download now button 5560, which when clicked by the user, causes the entered information to be transmitted to the web server 600 over the data network 400 for additional processing.

Once the information is received by the web server 600 the received phone number and/or identifier is authenticated. Optionally, a text message with a unique password is sent to the user which must be entered at the web site before proceeding. In another example, a call processing system places a call to the user and the user is requested to confirm their registration request. In yet another example, the Home Inventory system includes access to other databases for additional levels of user authentication. For example, the Home Inventory system accesses name information from an SS7 Caller Name (CNAM) database and the hosting telecommunications carrier from the SS7 Local Number Portability database. The accessible information optionally includes phone identification information (e.g., from an SS7 LIDB (Line Information Data Base) or ENUM (Telephone Number Mapping) database). Optionally, the system queries the mobile device provisioning database of the hosting telecommunications carrier to determine the make and model of the user's cell phone and from this determine if the mobile device has camera capabilities. Alternatively, the user may have to specify whether the mobile device is camera capable during or following the registration steps.

In this example, upon successful authentication, a user account is created in the user account database 700 and the information transmitted from the user is stored in the database.

Figure 6:
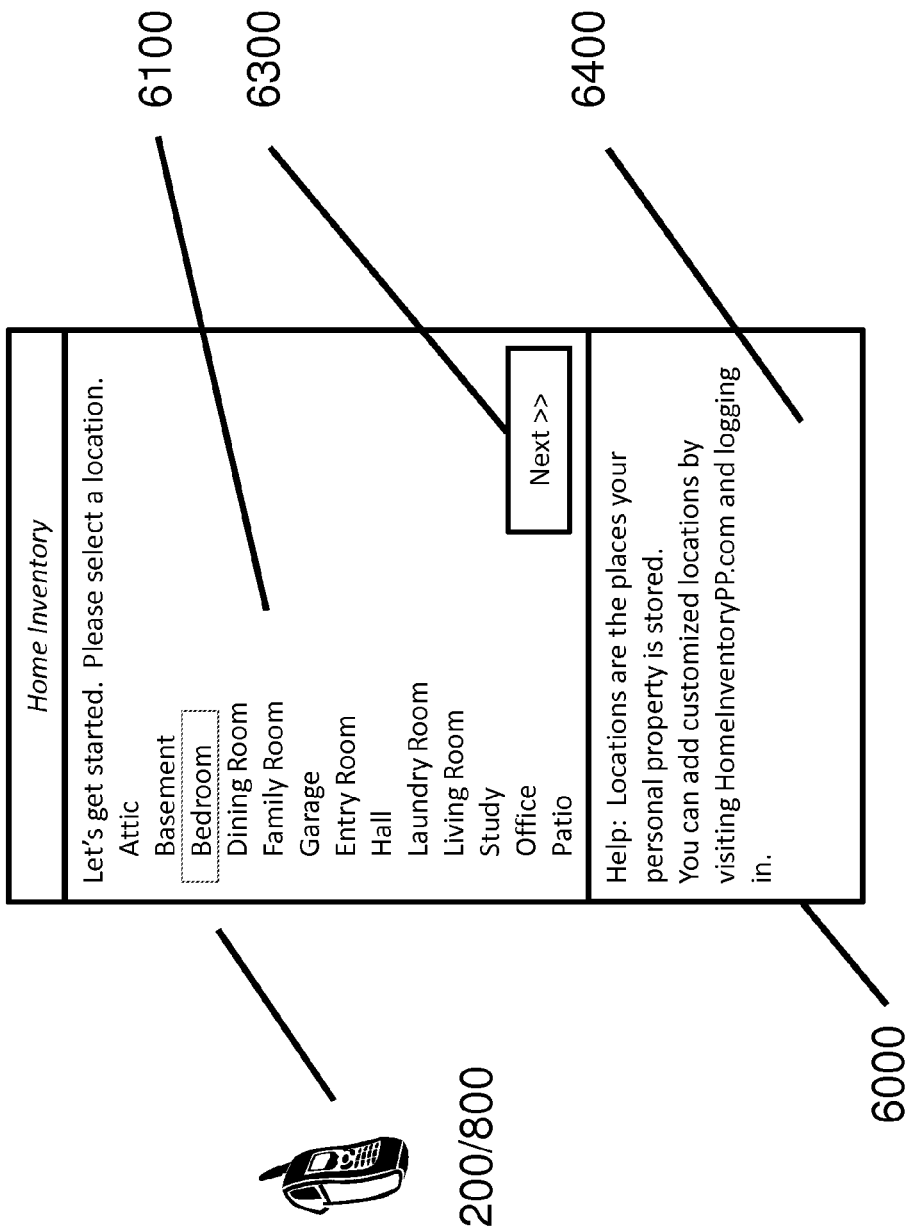
FIG. 6 illustrates an example user interface presented on a mobile device. The example interface enables a user to select a first location to inventory items.

FIG. 6 illustrates an example mobile device 200 user interface screen 6000 displayed by software application program 800. The user interface screens can be presented via a custom software application or by way of a browser or the like. The screen presents a list of locations 6100 which can be scrolled through by the user. In this example user interface, items can be selected via a double click or by scrolling to the item of interest and selecting the "next" control 6300. The user selection is optionally stored by the application program 800 and/or transmitted to web server 600 over the wireless network 300 and/or data network 400. In this example user interface, the screen has a "help" section 6400 which provides the user with additional instructions.

Figure 7:
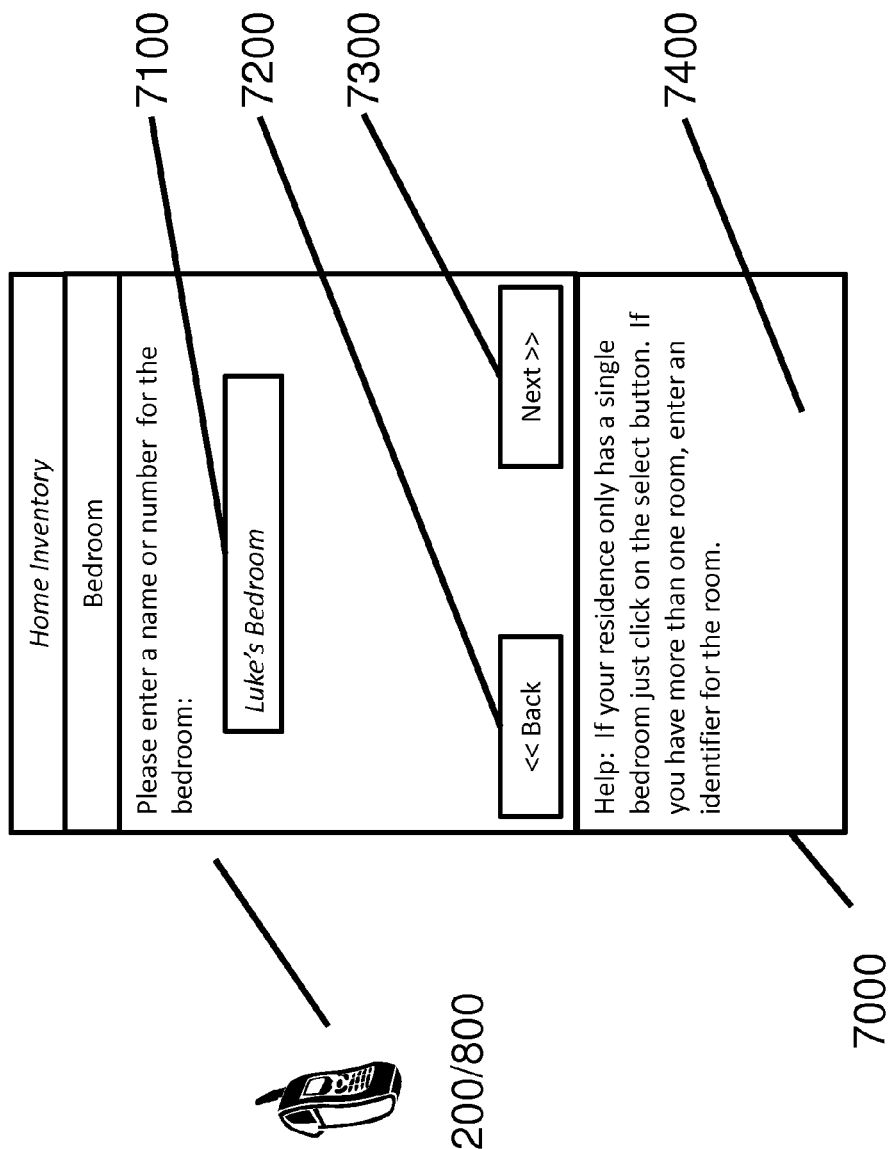
FIG. 7 illustrates an example user interface presented on a mobile device. The example interface enables a user to assign a name to a first location.

FIG. 7 illustrates another example mobile device 200 user interface screen 7000 displayed by software application program 800. The screen enables the user to customize the name of a location via a data entry field 7100. After a name is entered, the user advances to the next screen by selecting the "next" control 7300 (optionally no name is provided by the user). Optionally, the name and location (determined from the previous screen) entered by the user are transmitted substantially immediately to the web server 600 over the wireless network 300 and/or data network 400. Optionally, the selected location and entered name are temporarily stored on the mobile device and transmitted at a later period such as at the end of the user session or later. Optionally, an identifier (e.g., the user's mobile device phone number or other uniquely assigned identifier) and/or password are included in the transmission to the web server 600. The location and name are stored in the user account database 700. In this example user interface, the screen has a "back" control 7200 which when activated transitions the user to the previous viewed screen. Lastly, this example user interface also includes a "help" section 7400 which provides the user with additional instructions.

Figure 8:
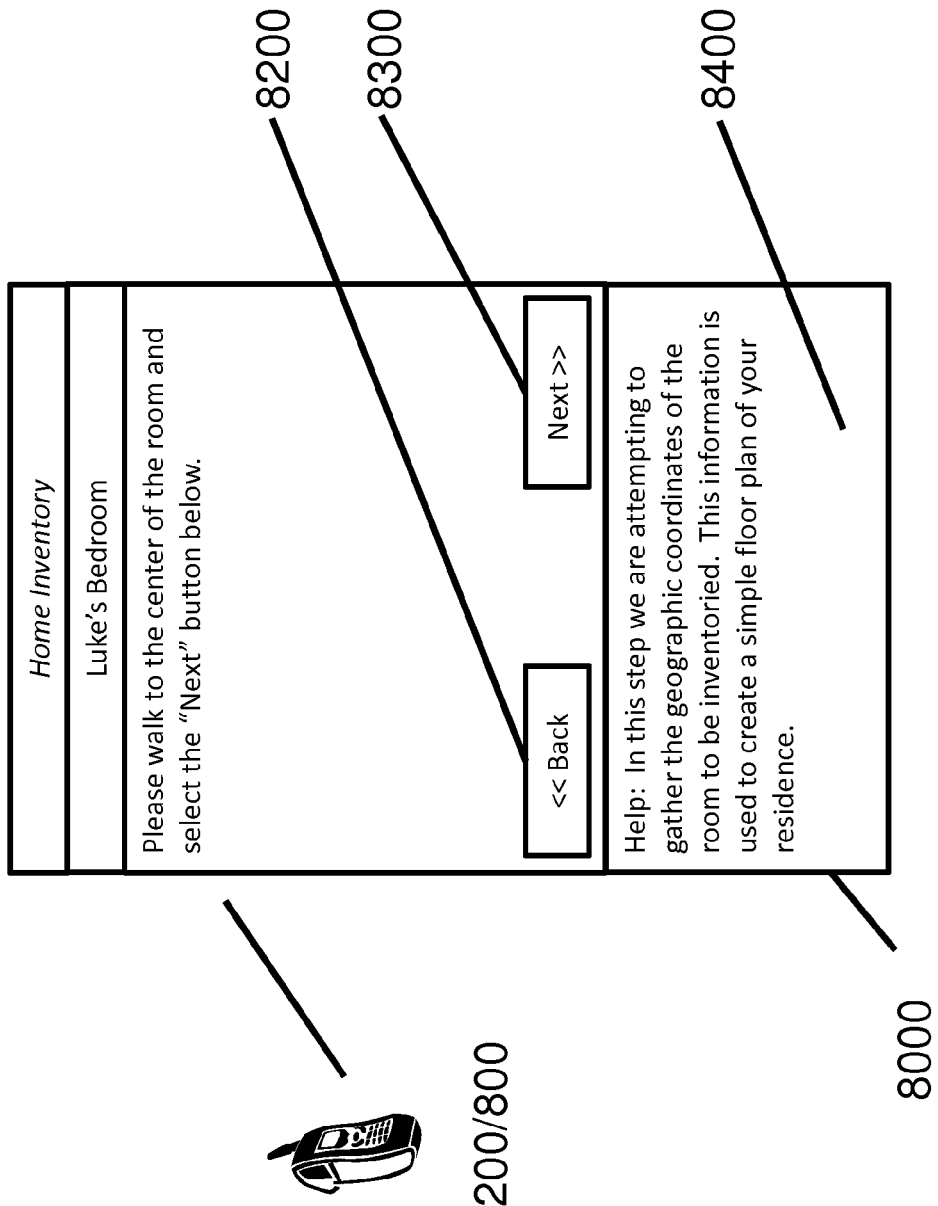
FIG. 8 illustrates an example user interface presented on a mobile device. The example interface facilitates the capture of geographic coordinates for a location.

FIG. 8 illustrates another example mobile device 200 user interface screen 8000 generated by software application program 800. In this example, the screen assists in the capture of the Global Positioning System (GPS) Coordinates of the current location. (Although GPS is used in this example, other methods of location identification could be used, e.g., cell tower triangulation). The user advances to the next screen by selecting the "next" control 8300. As is discussed in additional detail below, when the user selects "next", the application program 800 queries for the GPS coordinates of the current location. These coordinates are transmitted substantially immediately to the web server 600 over the wireless network 300 and/or data network 400. Optionally, the GPS coordinates are temporarily stored on the mobile device and transmitted at a later period such as at the end of the user session or later. Optionally, the GPS information is encrypted. Optionally, a time and date stamp is recorded and/or transmitted with each set of GPS coordinates/Location information.

Optionally, an identifier (e.g., the user's mobile device phone number or other uniquely assigned identifier) and/or password is included in the transmission to the web server 600. The selected location, GPS coordinates, and/or time are stored in the user account database 700. In this example user interface, the screen has a "back" control 8200 which when activated transitions the user to the previously viewed screen. Lastly, this example user interface includes a "help" section 8400 which provides the user with additional instructions.

As discussed later in the document, the location information is optionally used by the Home Inventory system to create a floor plan of the user's residence for web-site navigation. This location information is not limited to this single purpose. For example, the location information can be used to query real estate databases to determine the estimated value of a user's residence.

In another embodiment, the location information and/or date/time can be used by an insurance company to prevent fraud. In this example, an insurance inspector can query the HI database 700 to use the location and/or time/date information to confirm the personal property inventoried belongs to an individual (or at least was photographed at a given location) at the time of purchasing the insurance policy. The location information could also be used in conjunction with other applications and databases.

Figure 9:
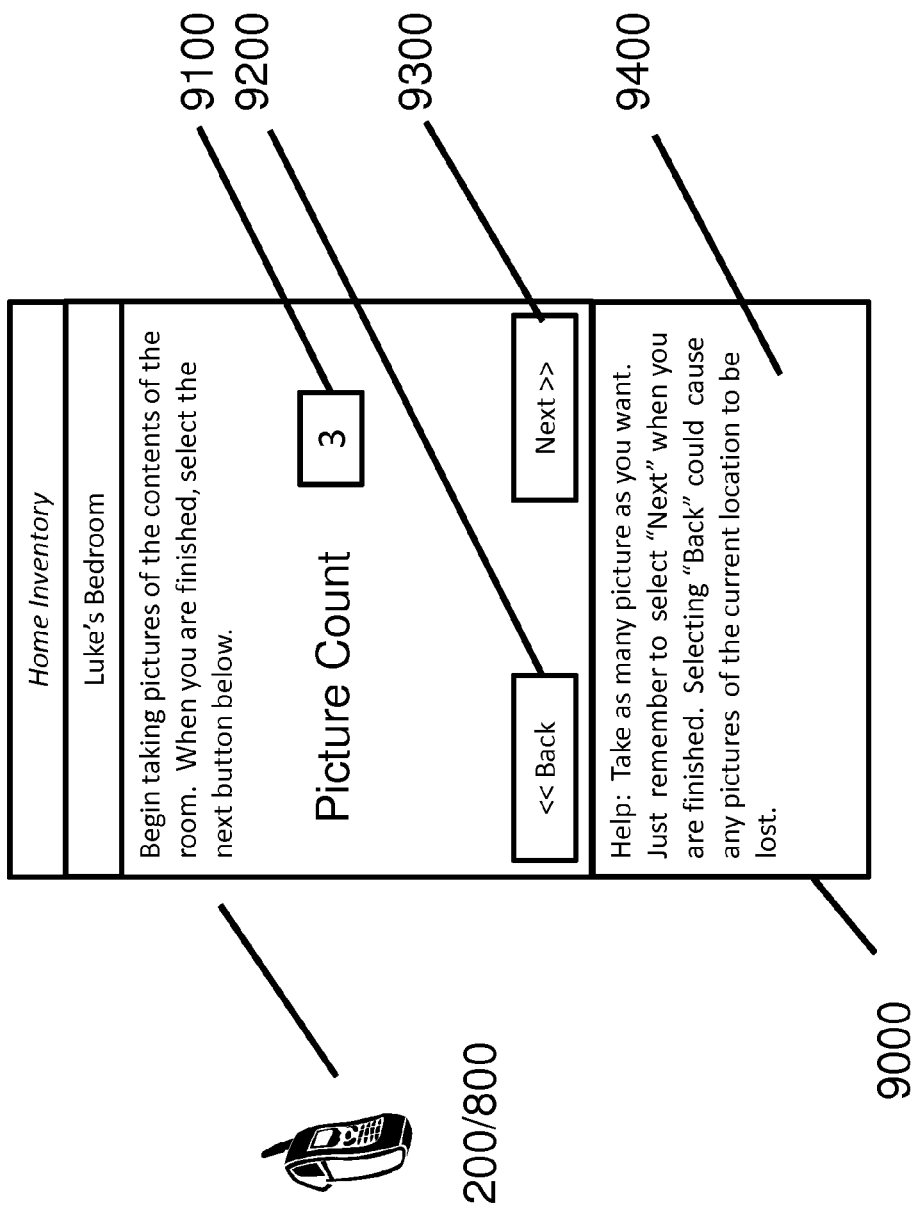
FIG. 9 illustrates an example user interface presented on a mobile device. The example interface visually tracks the number of images for a location.

FIG. 9 illustrates another example mobile device 200 user interface screen 9000 displayed by software application program 800. The software program 800 interfaces with the camera capabilities of the mobile device and the screen tracks the number of pictures 9100 taken at a given location. Optionally, a geographic location (e.g., GPS coordinates) and time/date is recorded with each picture/image. This location information can be used to enhance the floor plan rendition described below. In addition, the software application 800 user interface can optionally instruct the user to take pictures from different positions in a room/location. For example, the software program can instruct the user to take the first four pictures in a room/location with the user's back against each wall in order for the Home Inventory system to better ascertain the rooms/locations boundaries.) In this example, a user signifies the completion of the photography session at a given location and advances to the next screen by selecting the "next" control 9300. Optionally, the location, picture(s), and time/date taken by the user are transmitted substantially immediately to the web server 600 over the wireless network 300 and/or data network 400. Alternatively, the entered data is temporarily stored on the mobile device and transmitted at a later period such as at the end of the user session or later. Optionally, an identifier (e.g., the user's mobile device phone number or other uniquely assigned identifier) and/or a password are included in the transmission to the web server 600. The picture(s), location information, and/or time/date are stored in the user account database 700. In this example user interface, the screen has a "back" control 9200 which when activated transitions the user to the previous screen. Optionally, a warning message is displayed to the user if the user selects the "back" control that any images of the current location will be lost. Optionally, a different warning message is displayed prompting the caller to save or delete images of the current location. Lastly, this example user interface includes a "help" section 9400 which provides the user with additional instructions.

Figure 10:
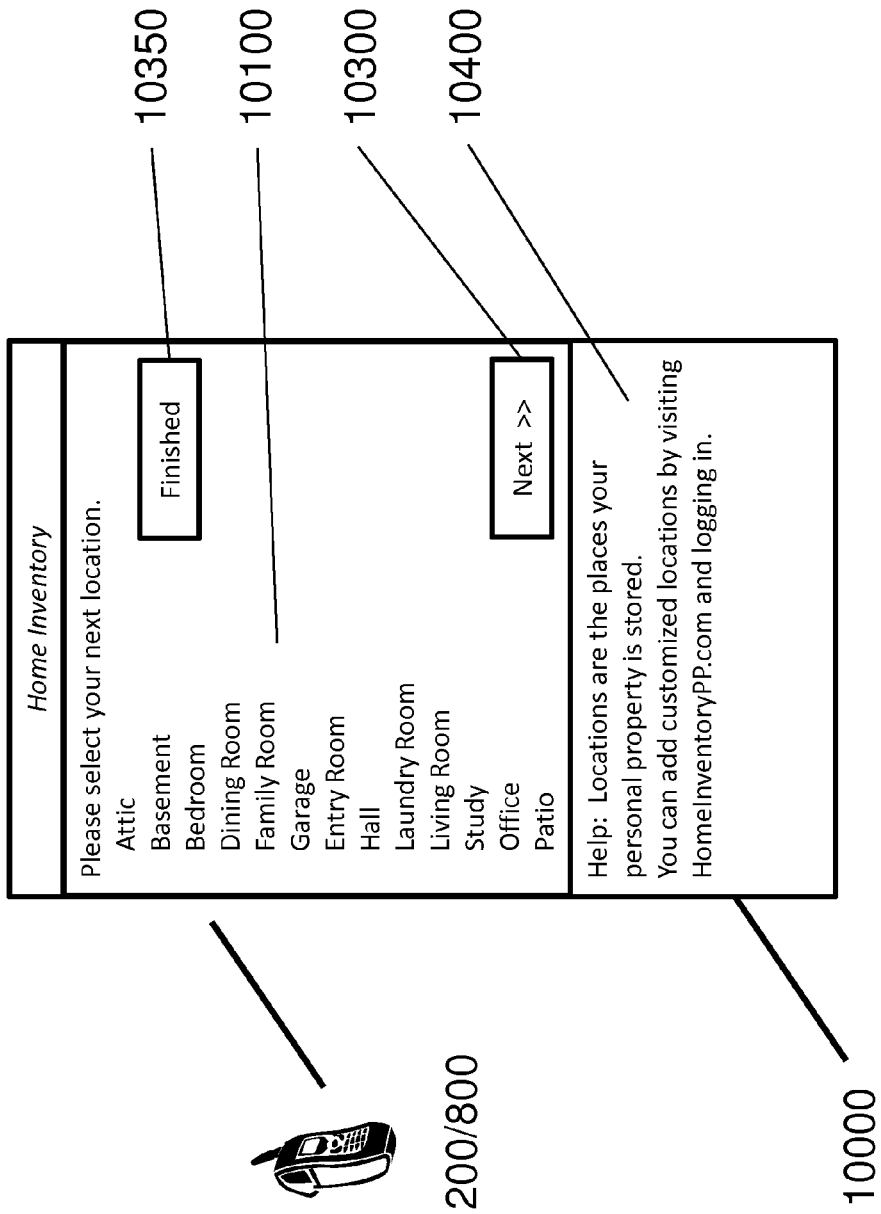
FIG. 10 illustrates an example user interface presented on a mobile device. The example interface enables a user to select a next location.

FIG. 10 is similar to FIG. 6. In this example, a mobile device 200 user interface screen 10000 is displayed by software application program 800 once a user has completed imaging a location. If the user selects the "finish" control 10350, the application program 800 begins or completes the transmission of any remaining user selections, locations names, geographic location coordinates, time/date, and images to the web server 600 over the wireless network 300 and/or data network 400. Optionally, an identifier and/or password are included in the transmission. Optionally, a notice is displayed to the user that the application is closing and the application is terminated.

The screen optionally presents a list of next locations 10100 to be imaged. In this example user interface, items can be selected via a double click or by scrolling to the item of interest and selecting the "next" control 10300. The user selection is optionally stored by the application program 800 and/or transmitted to web server 600 over the wireless network 300 and/or data network 400. In this example user interface, the screen has a "help" section 10400 which provides the user with additional instructions.

Figure 11:
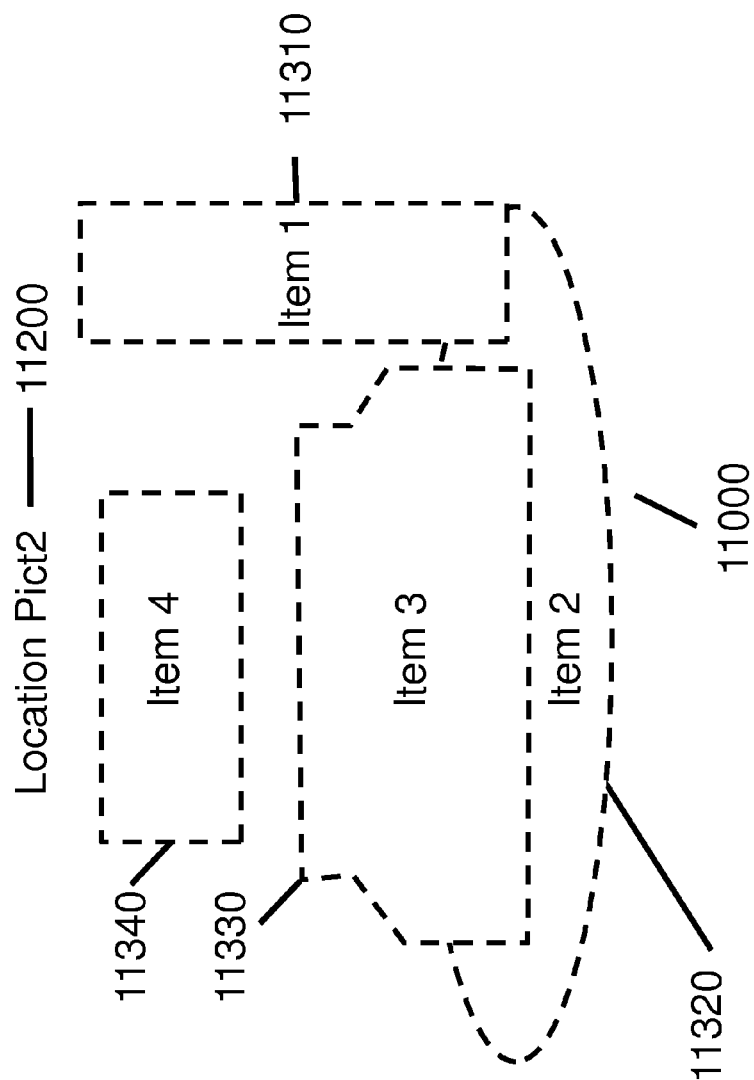
FIG. 11 illustrates an example photo item map rendered by a Home Inventory system using an image taken by a user.

Upon receipt of the room photo images, the Home Inventory system 900 creates an initial list of items depicted in each photo. Manual and/or automatic methods of item separation and identification are used including a combination of image filtering, color change detection, item outline detection, etc. FIG. 11 illustrates an example item map 11000 rendered from a user's photo image by the HI system 900. An outline of each item (11310, 11320, 11330, and 11340) is depicted along with a sequentially number item name. The original photo label 11200 is also depicted on the rendition. This will later be used to enable users to view location images and append additional information with each item in an image.

Optionally, the Home Inventory system next uses pattern recognition techniques in combination with a predefined library of household items to label each item in the selected item map. For example, in FIG. 12, the Home Inventory system attaches the label "lamp" 12310 to outline 11310 in FIG. 11. Similarly, the outlines 11320 and 11330 in FIG. 11 are labeled Area Rug 12320 and Loveseat 12330 respectively in FIG. 12. Lastly, the outline 11340 in FIG. 11 is labeled ?Picture? 12340 in FIG. 12 where the "?" delimiters signify that the image recognition algorithm has not been able to make a good match and recommends that the user (or service provider) more closely review the associated label 12340. In some cases the recognizer may not even be able to suggest a label and would flag the unknown label with a "?item <number>?" designation. These labels can be accepted or rejected by a user by selecting the designated label and renaming the item. These user edits are downloaded to the Home Inventory system and stored in the customer database 700. In addition, user edits are used to train the recognizer to improve the overall accuracy of the Home Inventory system. Optionally, the label attached to items by the recognizer is initially distinguished from items named by the user (e.g., by using italics or {brackets} to designate user modifications). Optionally, only those items with a configurable, low confidence value, from the recognizer are identified as tentative or temporary. Optionally, the recognizer may have difficulty determining whether the object is an item A or B. In this case, the Home Inventory system might display two labeled items with questions marks. For example, In FIG. 12, the Home Inventory system might display item 12340 as label "?Picture? or ?TV?" (as in flat screen television) and prompt the user to choose one. Optionally, there is a picture map pallet 21400 (see FIG. 21) which guides the user in the labeling of items.

Optionally, the Home Inventory system transmits or makes available to live operators the results of the image item recognition step. The live operators can optionally audit the results and/or make changes to the labels assigned by the Home Inventory system before the Home Inventory system makes the results available to a user. Thereby, further enhancing the quality of the system performance. As described above, any changes by the live operators and/or end user can be used to further improve the quality of the item recognizer. In an alternative embodiment, the entire process is performed by live operators including separating items within the image, identifying and labeling each item, replacing the identified item outline with an appropriate generic line drawing of the item, and reviewing/auditing the resultant image rendition for accuracy and clarity.

Figure 13:
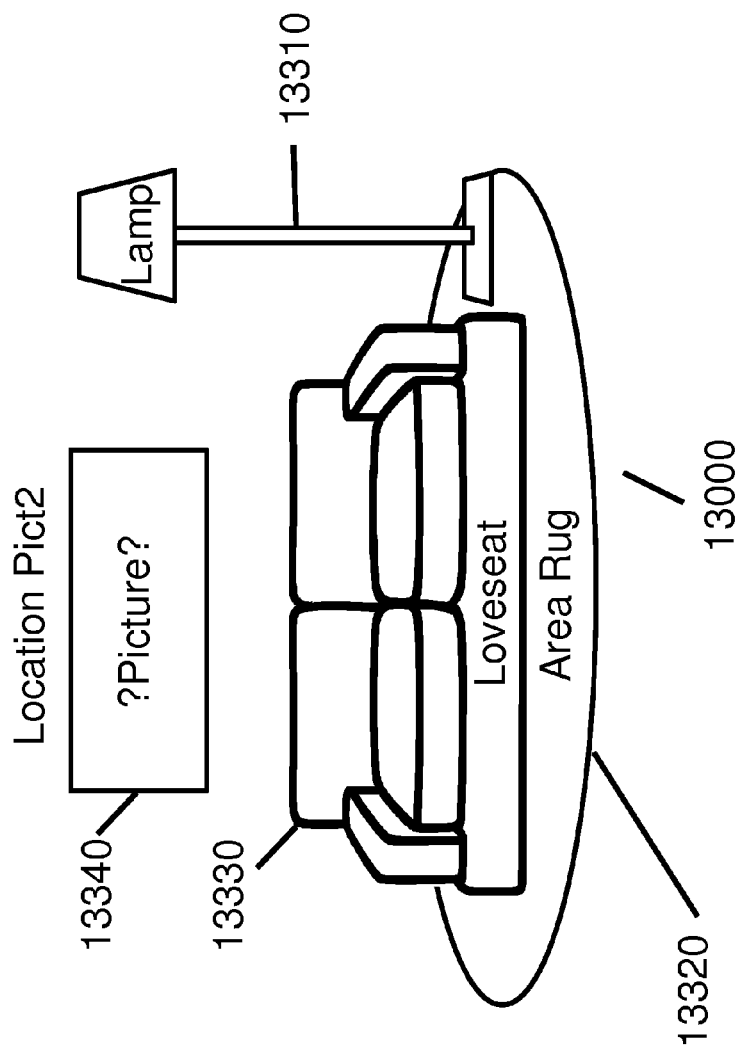
FIG. 13 illustrates an example photo item line drawing with item labels generated by a Home Inventory system.

Optionally the user requests the Home Inventory system replace the item outline rendition 12000 with a generic line drawing version 13000 of the items in the photo (see FIG. 13). The user can configure their service to automatically perform this step or wait for user interface gestures to change the presentation between these two alternate views.

Labels and drawings of the user's personal property improve the overall quality of the system as perceived by the user. Furthermore, labeling items allows the Home Inventory system to create or query an external database for appraisal and replacement value of equivalent items.

In addition, in some instances the recognizer is not able to distinguish certain items from other items in the image in order to create the optional outline view. Optionally, editing tools are provided to enable the user to edit the rendition. For example, new lines can be added and existing lines extended to separate items. Optionally, lines can be erased to couple multiple items together. Optionally, multiple items can be joined (e.g., by selecting multiple items with the shift key held down) into a single item. Optionally, the user can replace items from the list of pallet items. Optionally, the user can define their own pallet item. Optionally, a user can toggle between an enlarged view of the actual image and a reduced view of the rendition whereby the image rendition is displayed in the thumbnail and the actual image is displayed in the larger area of the web page.

Figure 14:
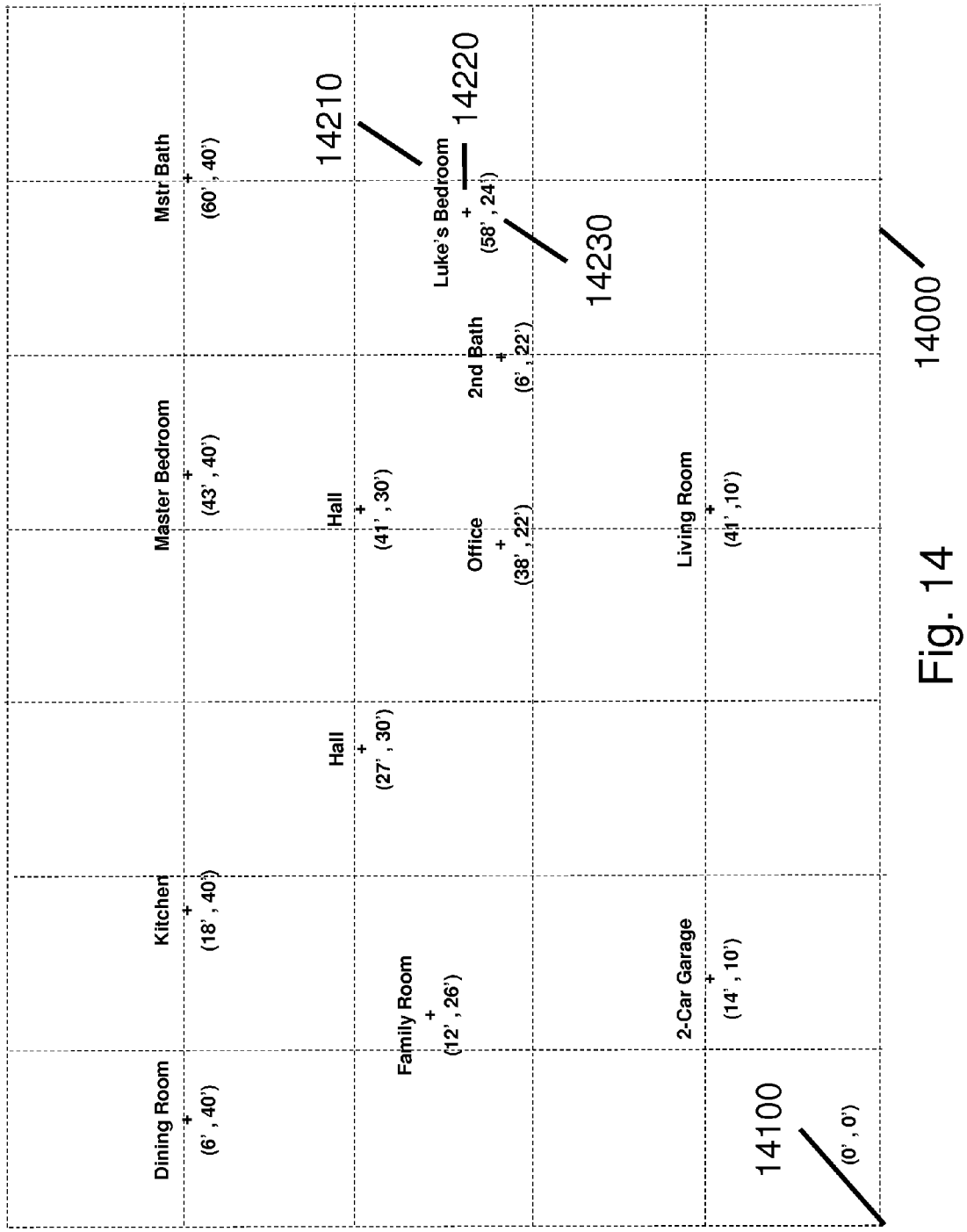
FIG. 14 illustrates an example gridded plot of a user's room locations generated by an example Home Inventory system.

In this example, upon completion of user entry of room photos and associated locations, the Home Inventory system 900 stores the information in the database 700 and creates a plot 14000 of the room center points on a 10'×10' grid 14100 (see FIG. 14). Recorded information includes the room label 14210, the room center point marking 14220, and the room center point coordinates 14230 relative to the 0'×0' origin 14100 of the grid.

Figure 15:
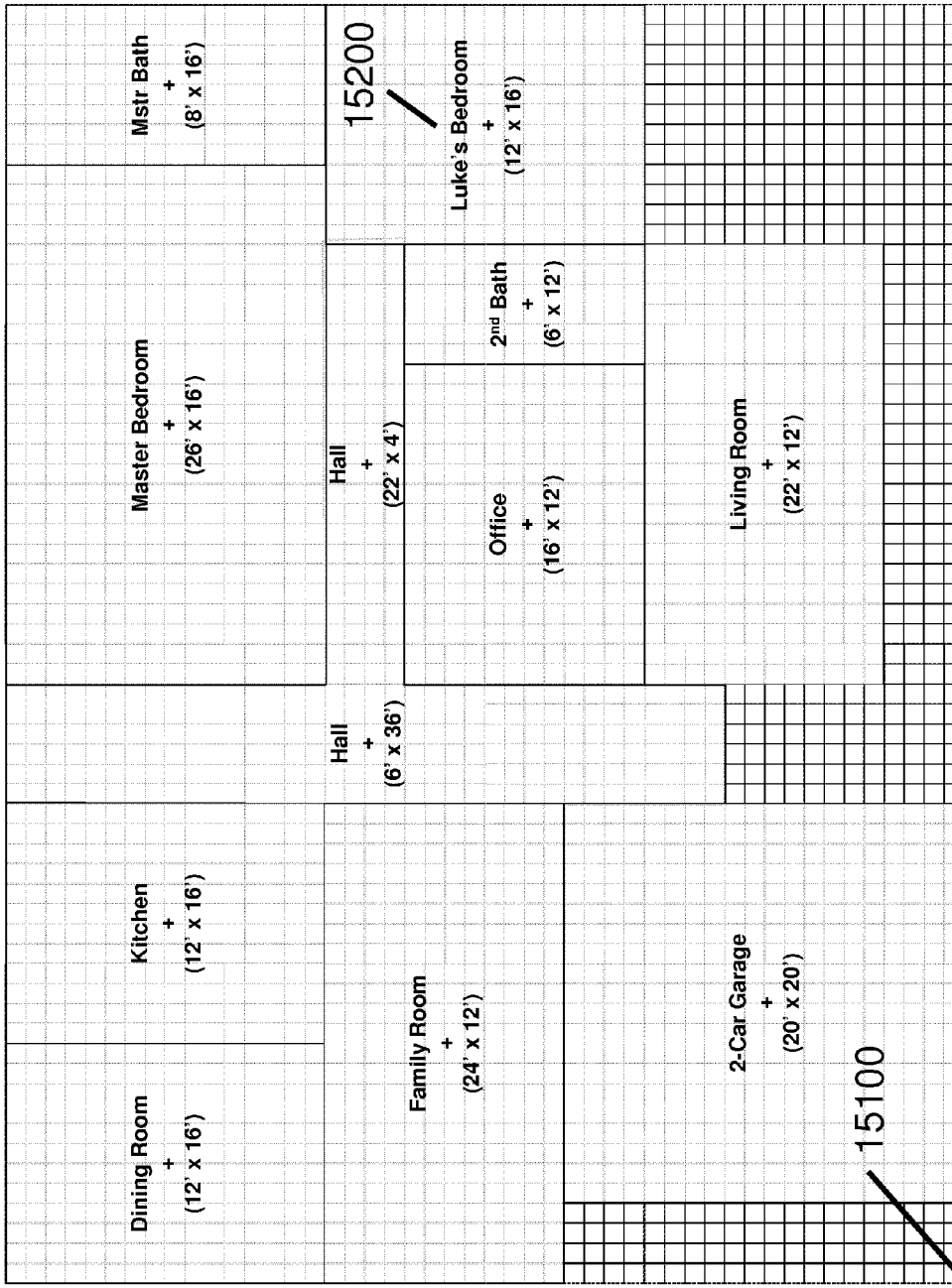
FIG. 15 illustrates an example rendition of a user's floor plan generated by an example Home Inventory system.

The HI system 900 then creates a floor plan of the user's residence from the room center point plot above. FIG. 15 illustrates an example floor plan 15000 generated by the Home Inventory system using the locations selected by a user from their mobile device 200 and the GPS coordinates (or other geographic location information) received at the web server 600.

The rendition of a user's residence is created, by example, using a combination of user selected locations together with the downloaded GPS coordinates (or other geographic location information). As described in the state flow below, a user centers himself/herself in a room and enters a gesture on mobile device 200 which causes their current GPS coordinates to be downloaded to the Home Inventory system 900. The Home Inventory system uses the collection of coordinates downloaded to create an initial rendition. The Home Inventory system may end up with a very simplistic rendition if the user only selects bedroom locations. However, more rooms, hallways, bathrooms, patio, garage, etc. selected by the user and downloaded with GPS coordinates allows the Home Inventory system to improve the floor plan rendition. In addition, certain characteristics of the location selected by the user can be used to position and/or size a room/element in the rendition. For example, the size of bathrooms can be estimated to be one-quarter the size of an associated bedroom. In another example, a bathroom situated between two bedrooms can be interpreted to be a Jack-And-Jill bathroom with slightly larger dimensions than a traditional bathroom. A collection of heuristics including location area, age of the residence, city and county codes, etc. can be used as input into the Home Inventory system 900 to improve the quality of the generated rendition. In addition, other geographic location data points (e.g., associated with images) can be used to further enhance the quality of the rendition. Optionally, a graphics editing package can be incorporated in the Home Inventory system enabling users to further enhance the drawing (e.g., resize and rotate rooms, modify layout, etc.).

Figure 16:
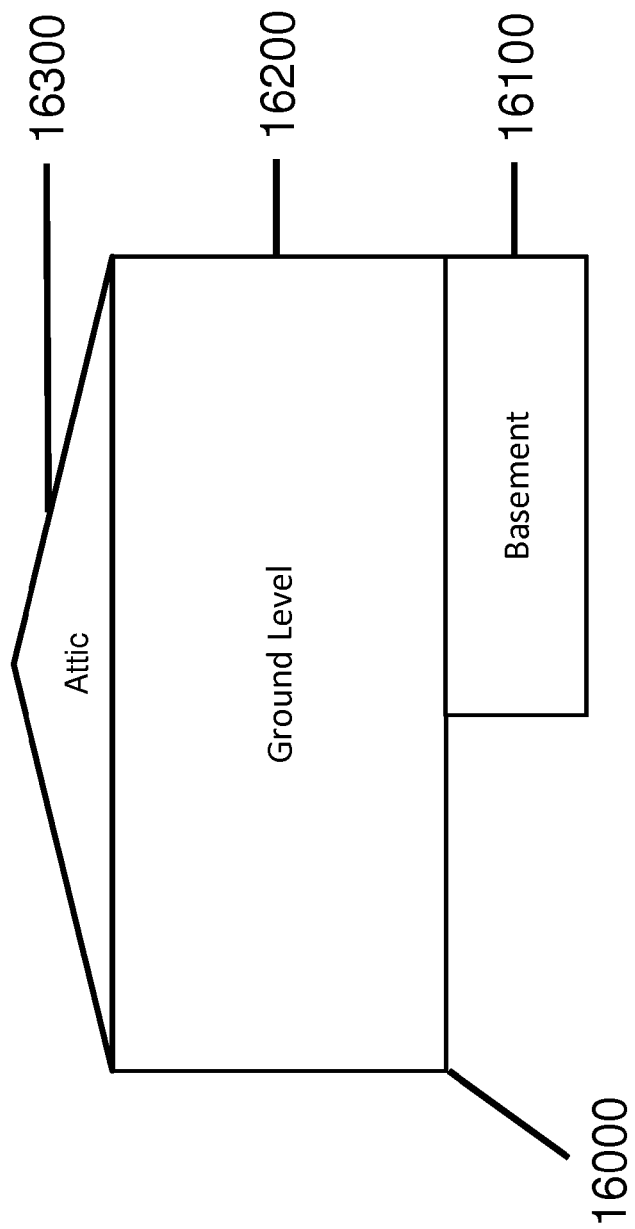
FIG. 16 illustrates an example side view drawing of elevation levels of a user's residence generated by an example Home Inventory system.

FIG. 16 illustrates an example side view of the user's residence 16000 created by the Home Inventory system. In this example, the user designated a single level residence during registration and selected basement 16100 and attic 16300 locations during the location and imaging steps (e.g., if the user selects the line items basement and/or attic in the locations list 10100 in FIG. 10 the Home Inventory system adds these elements to the side view).

Figure 17:
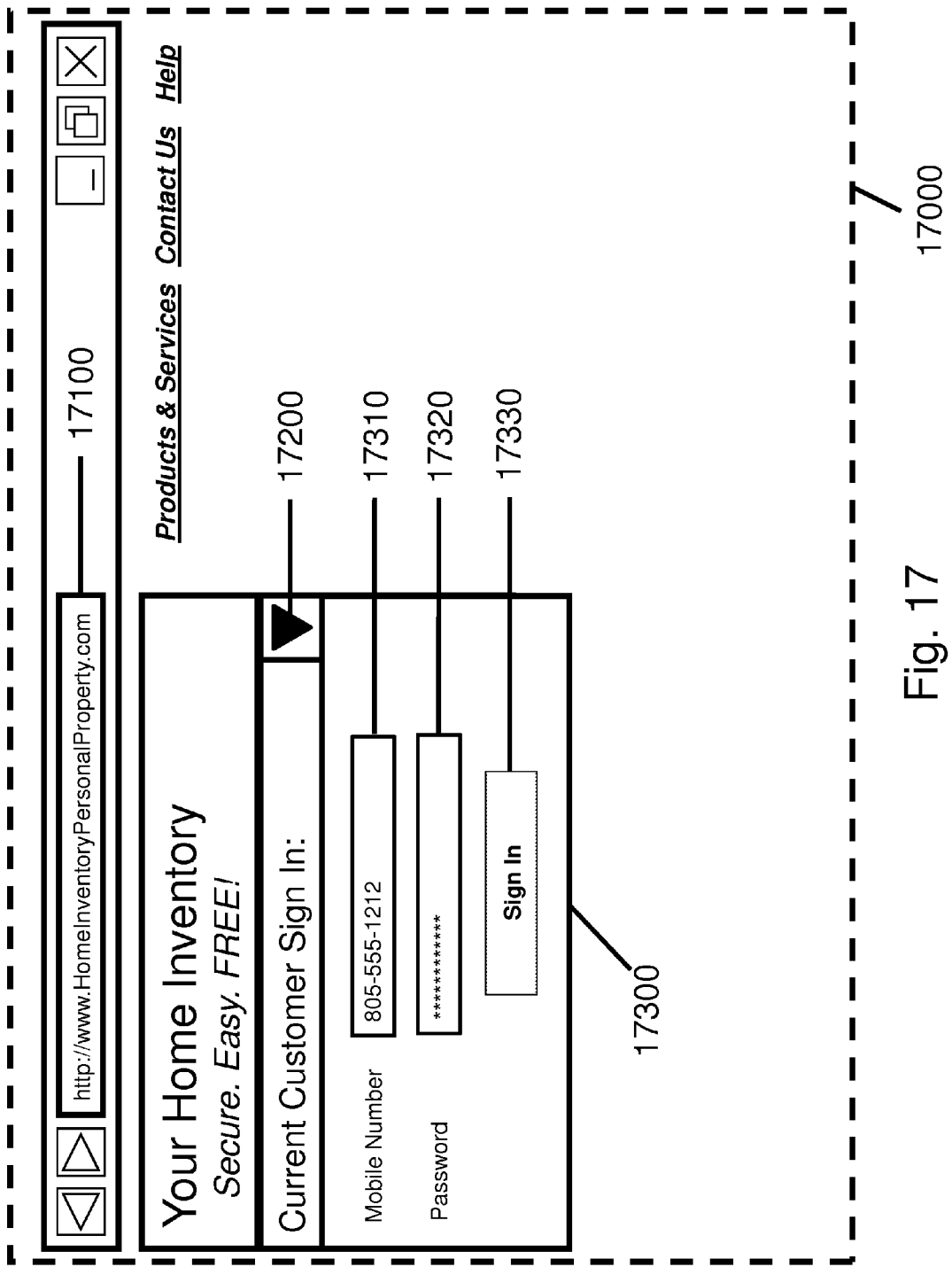
FIG. 17 illustrates an example login user interface presented to a returning user of the Home Inventory system.

FIG. 17 illustrates an example login user interface 17000 presented via a browser (or other interface application) to a user. The browser can be, by way of example executing on a computer terminal 100, such as a personal computer, a Wireless Application Protocol (WAP) or browser-enabled phone, a PDA or the like. The login/registration web page can optionally be accessed by supplying the appropriate URL 17100 to the browser, by selecting a link in response to a search query, or the like. In this example, the returning user can reach this web page by selecting the current customer login control 4200 shown in FIG. 4. The example user login pull down menu pane 17300 includes a mobile phone number entry field 17310 and a password entry field 17320. When a user clicks on the Sign In control 17330, the entered mobile number and password are transmitted to the web server 600 over the data network 400 for authentication.

Figure 18:
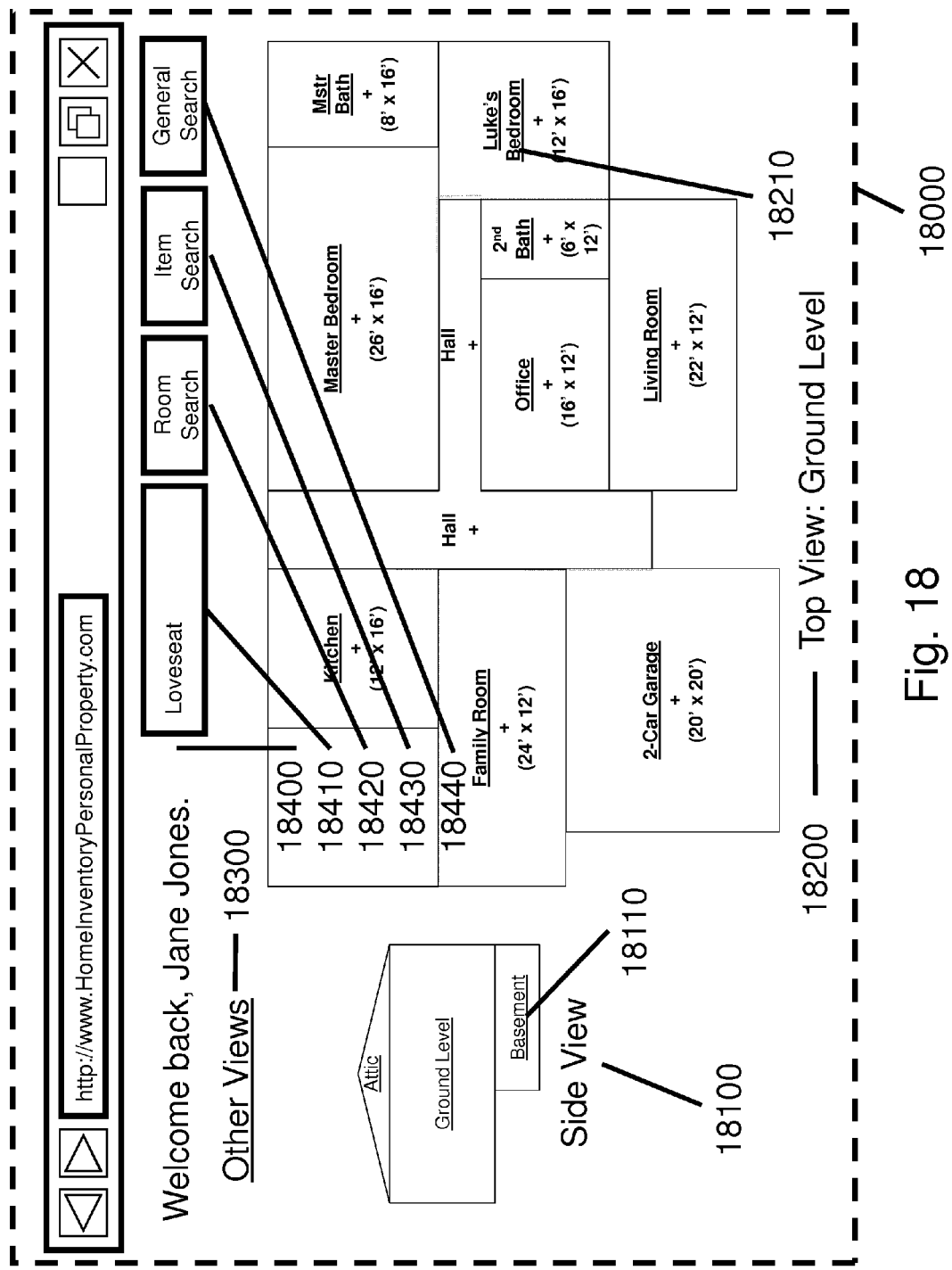
FIG. 18 illustrates an example welcome page and web display of a user's floor plan.

FIG. 18 illustrates an example rendition of a user's residence 18000 presented via a browser (or other interface application) after the user has completed a series of imaging and location selection steps and successfully logged in as described in FIG. 3 states 21-24. The Home Inventory system side view 18100 of the residence is displayed in the left side of the page. An illustration of the top view of the ground level floor 18200 generated by the Home Inventory system is displayed in the center to right hand side of the page. The user can change the main view in this example from attic, to ground level, to basement by selecting the named areas in the side view 18100. In addition, in this example, each of the locations identified on the top view floor plan of the selected elevation level (in this example, the ground level) is an active URL/link that can be clicked through to display another web page which provides a user interface to organize items at that selected location. For example, selecting the link representing Luke's Bedroom 18210 displays a listing of the items currently inventoried there (see FIG. 19 and its description below). Optionally, the Home Inventory system presents additional other views 18300. For example, the Home Inventory system could present an ordered list of locations.

Additionally, the web page 18000 also includes a search capability 18400 to further assist the user navigation to view selected inventory details. The user enters search terms in the search key word field 18410 and then clicks either the Room Search button 18420, the Item Search button 18430, or the General Search button 18440 (for a default search through all customer records). Each user account includes a personalized search term dictionary linked to their account in the customer HI database 700. This personal dictionary is initially populated with default parameters from a global system wide dictionary when the account is first registered. As the user creates new item names, the personal dictionary is automatically updated. Room and photo names/labels are also entered into the personal dictionary. The Home Inventory system 900 periodically (e.g., daily) mines personal user dictionaries to refine the global dictionary contents.

Figure 19:
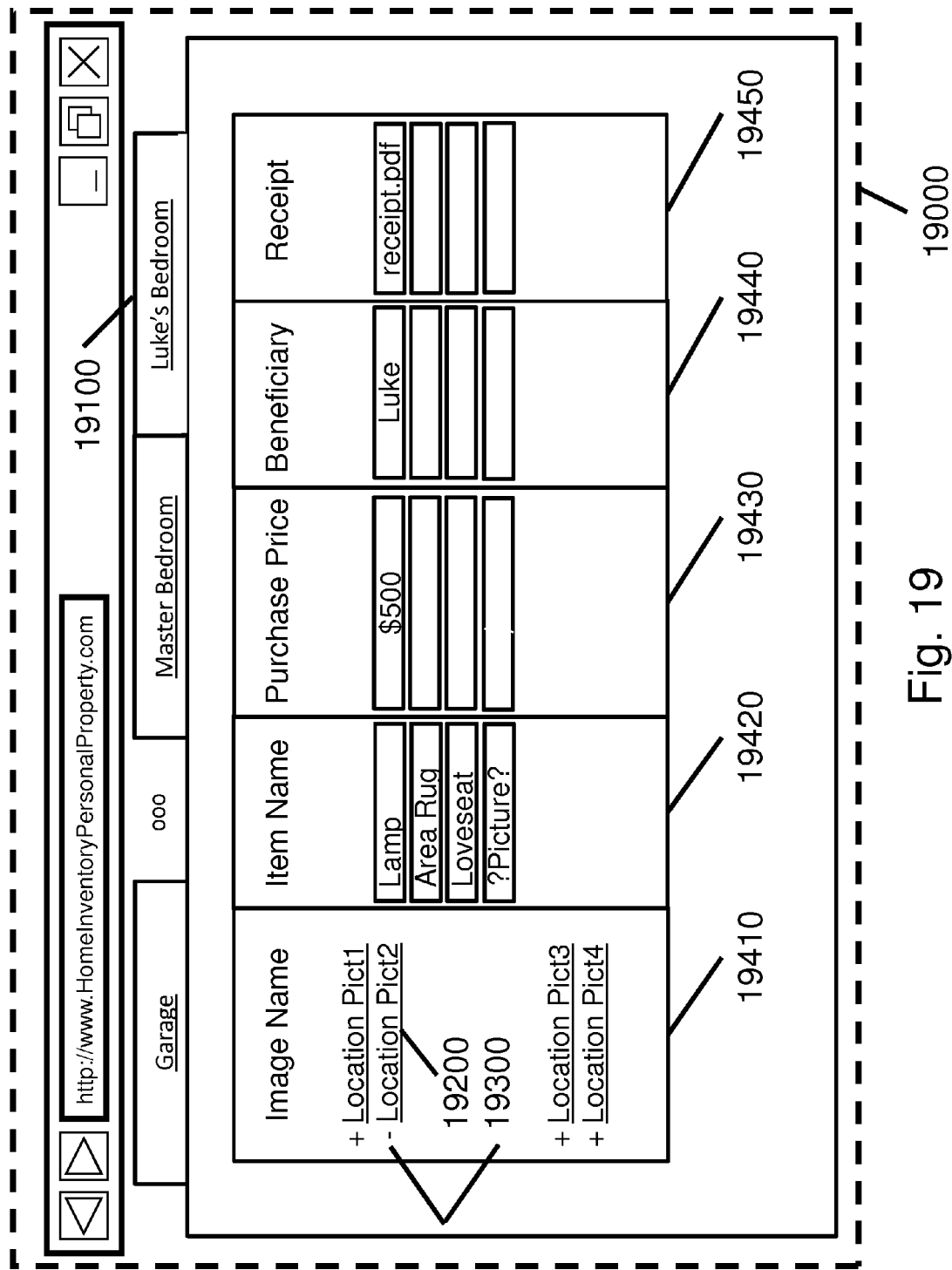
FIG. 19 illustrates an example web display of the contents of a location in a tabular list view.

FIG. 19 illustrates another example user interface 19000 presented via a browser (or other interface application). This user interface enables a user to further enumerate and itemize their household belongings. In this example, this user interface is accessed by a user selecting a location, such as Luke's Bedroom 18210 from FIG. 18. A tabbed user interface 19100 is shown in FIG. 19 although other user interfaces can be used. Optionally, other tabs across the top include all of the locations (depending upon the number of locations), or the higher-level abstraction of the different floor levels.

Labels of the camera images 19200 for each room are listed for the user. In this example, a default name is assigned to each image; Location Pict1 for the first camera image taken by the user, Location Pict2 for the second camera image, etc. Optionally, the user can edit the image name. In this example, the user has selected Location Pict2 and the items within the image are listed. Each image contains no items, one item, or multiple items. A user can edit the labels/names 19420 and number of items associated with an image as will be described in further detail below. In this example, each item within an image can also be assigned an actual or estimated purchase price value. A user can assign an original purchase price and/or estimate the current dollar value of an item 19430. In addition, a user can associate a beneficiary 19440 to each listed item. Lastly, in this example, a user can attach a scanned in receipt, warranty contract, and/or other forms of notes for an item 19450. The user selects the field corresponding to the item or picture in the receipts column 19450 and then requests to specify the path name or browse to the scanned in receipt. In this example, the specified file is downloaded from the user's PC across the data network 400 and stored in the user account database 700.

An image is not required to create a list of items for a location. In this example, four camera images were captured for "Luke's" bedroom. Optionally, the user can manually type in a list of items for "Luke's" bedroom.

In this example web presentation, each of the labeled images has an associated URL 19200 to the image and an image item list minimize[−]/maximize[+] button 19300. The list of image items is displayed when in the maximized[+] mode and is suppressed when in the minimized[−] mode. Clicking on the image label causes the stored image to be displayed to the user.

Figure 20:
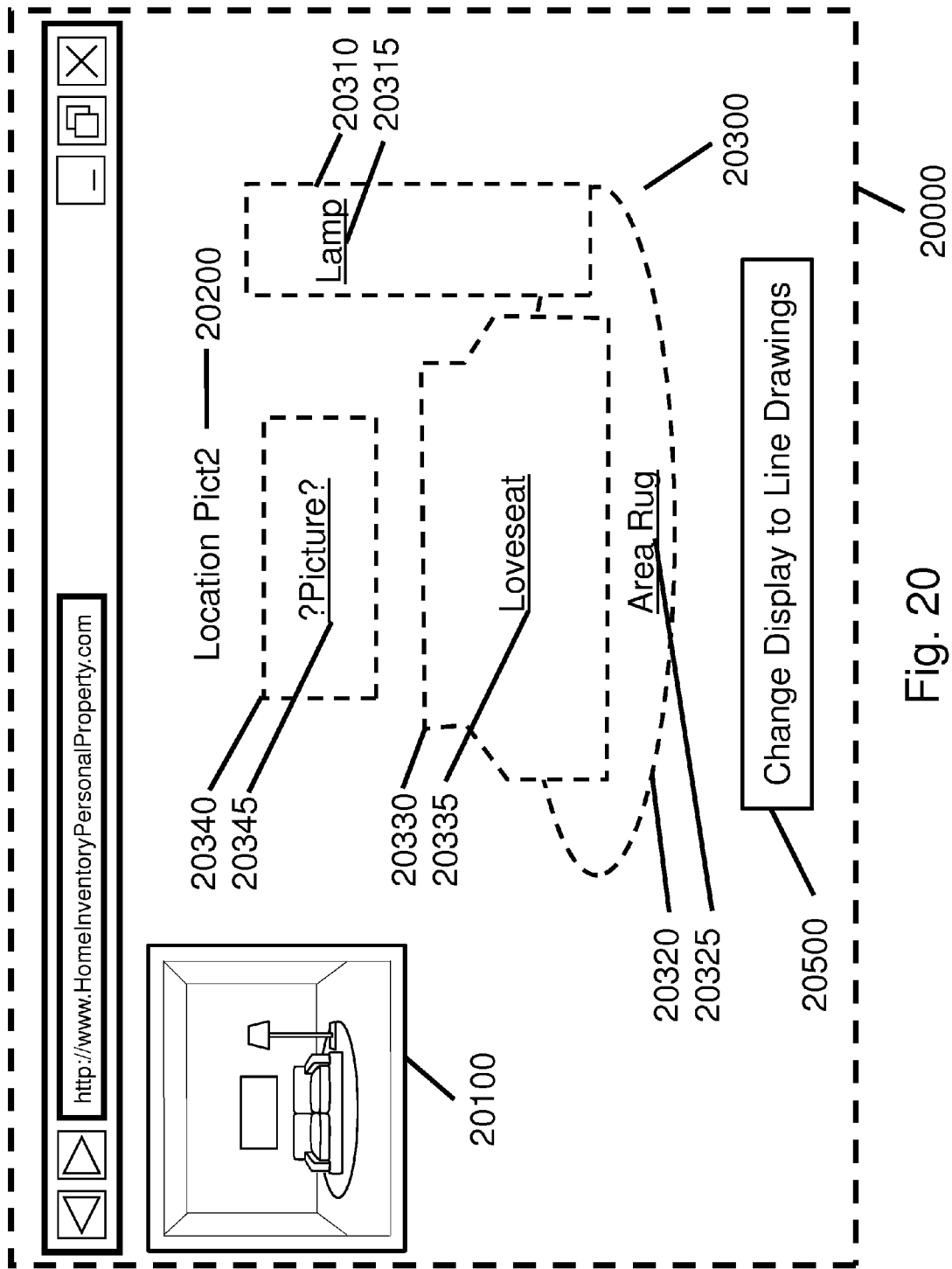
FIG. 20 illustrates an example web display of an image taken by a user and a rendition of the image created by a Home Inventory system. The example includes an item map and labels assigned by a Home Inventory system to individual items.

FIG. 20 illustrates another example user interface 20000 presented via a browser (or other interface application). This example user interface enables a user to view location images and append additional information with each item in an image. Optionally, other manual or automatic methods of item separation and identification can be used including a combination of image filtering, color change detection, item outline detection, etc.

In this example illustration, the web page contains three major elements: a thumbnail view of the actual image 20100, the photo title or label 20200 assigned to the image, and an outlined rendition of the labeled items in the camera image 20300 (the elements 20310, 20320, 20330, and 20340 and associated item labels 20315, 20325, 20335, and 20345). The item outline rendition is a processed image by the Home Inventory system wherein individual items become individual elements of the picture with each element having an associated item outline and item label with an associated clickable link. In this example embodiment, the individual elements appear in the rendition as outlined items. For example, in FIG. 20, image processing and link embedding techniques are applied to create an image rendition which includes four separate items: item 1 (the lamp) 20310, item 2 (the area rug) 20320, item 3 (the loveseat) 20330, and item 4 (the picture) 20340.

Figure 21:
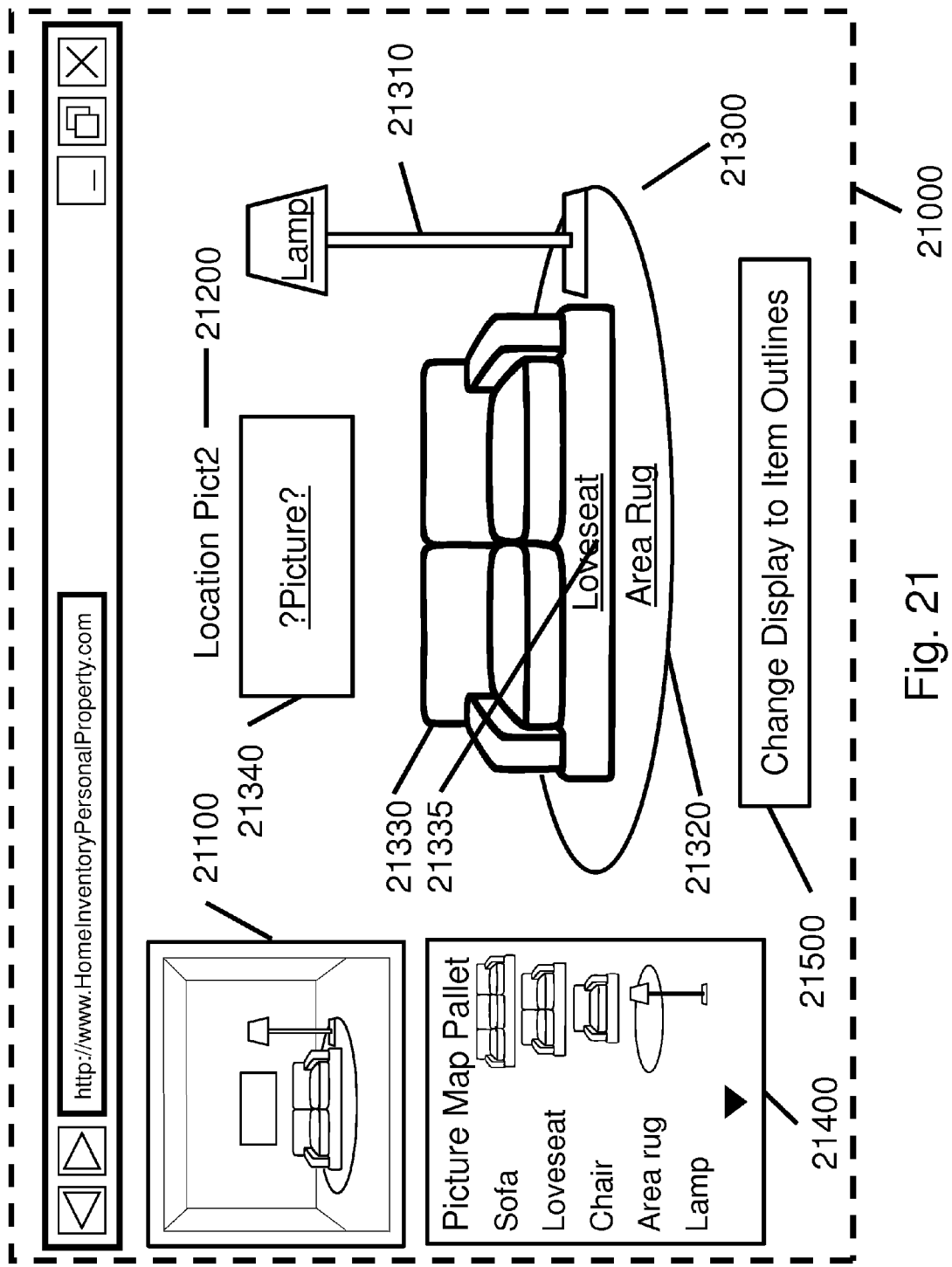
FIG. 21 illustrates an example web display of a second rendition of an image taken by a user. In this example rendition, generic line drawings have replaced outlined items.

Optionally the user requests the Home Inventory system change the display from the item outline rendition to a generic line drawing version of the photo image. The system could automatically replace the items after a user modifies a label, upon entry to the web page, or in response to the user selecting a web control option such as 20500 in FIG. 20. FIG. 21 illustrates the resultant view 21000 in which all of the outlined items have been replaced with generic template drawings to further enhance the rendition. For example, in FIG. 21, the Home Inventory system replaces the outline 20310 in FIG. 20 with a generic drawn lamp 21310. Similarly, the outlines 20320-20340 in FIG. 20 are replaced with generic drawn items Area Rug 21320, Loveseat 21330, and Picture 21340 respectively. The user can return to the item outline view 20000 by clicking the Change Display to Item Outlines button 21500.

Figure 22:
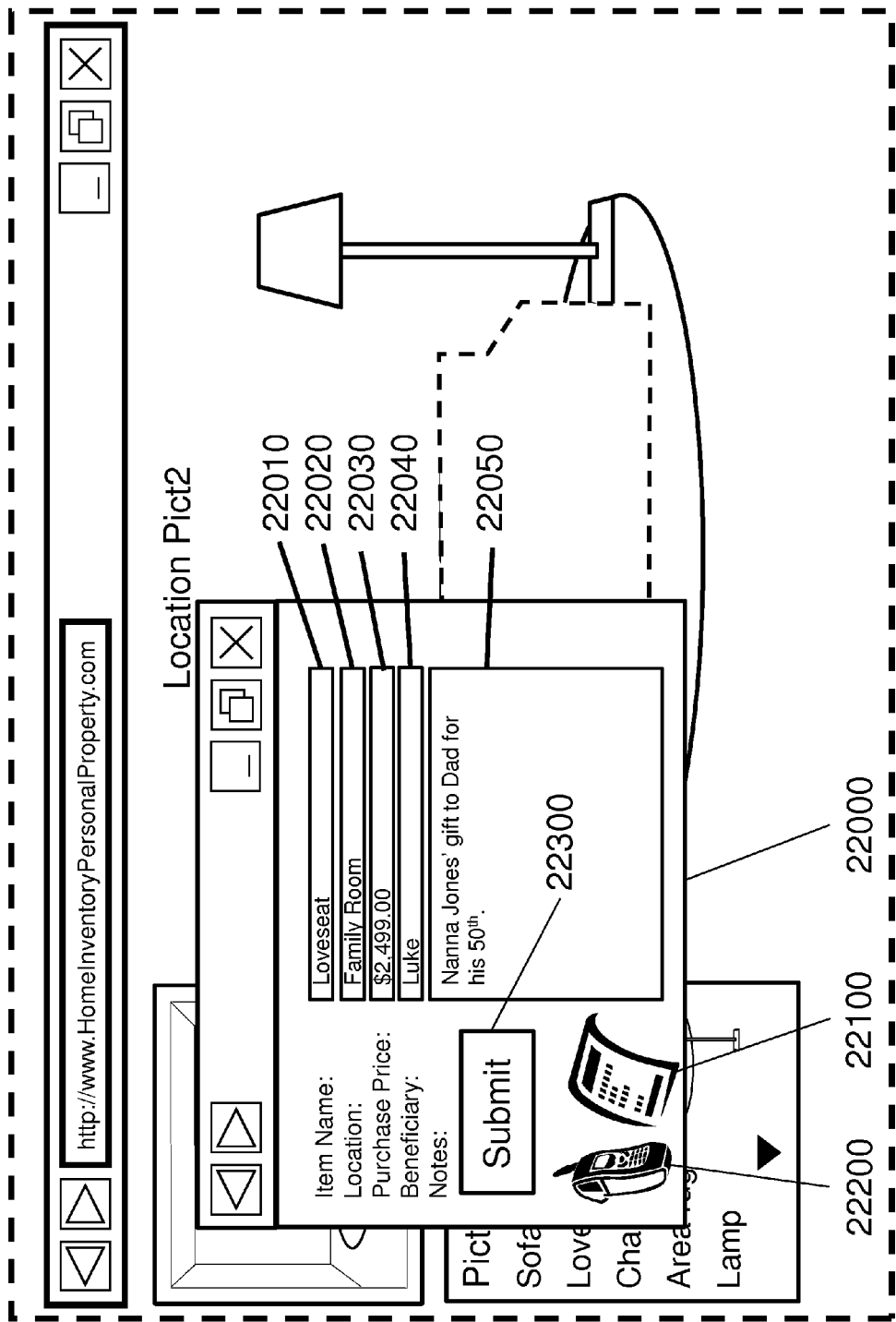
FIG. 22 illustrates an example web display enabling a user to edit fields to provide additional information regarding an item in an image.

FIG. 22 illustrates another example user interface 22000 presented via a browser (or other interface application). This example user interface enables a user to select an item within a picture rendition and include additional information about the item. This example web page was presented in response to a user clicking on the "Loveseat" item link 21335 in FIG. 21.

In this example, the pop-up web form 22000 prompts the user to enter a structured set of information. The user can enter a name or title 22010 for the item. The user can enter an item value 22030 (e.g., the purchase price). The user can designate a beneficiary for the item 22040. The user can also attach a purchase receipt or warranty to the item as described below. In this example, there is also a note field 22050 for general information to be detailed by the user about the selected item. Optionally, the user can change the location 22020 by retyping a new location and/or selecting from a menu list of locations (e.g., when an item is moved from one room to another).

Optionally, to simplify the data capture user experience, the user can speak the information related to the item rather than manually entering the information. In this example, the user can select the phone icon 22200 which can optionally invoke the software program 800 running on the mobile device 200 and visually prompt the user to speak information related to the items (e.g., item name, item value, etc.) The recorded speech is downloaded to the network-based server 600 over the wireless network 300 and/or data network 400. Automatic speech recognition techniques and/or transcription operators can convert the speech to text. The text is stored in the customer data base 700 and optionally displayed to the user through a web interface (or the software program 800 on the mobile device) for final approval and/or editing. Optionally, selecting the phone icon 22200 can cause a call to be placed to the user's cell phone. From this point, an interactive voice response session occurs between the user and the network-based Phone Server 500. Recorded speech at the phone server 500 is similarly transcribed using automatic speech recognition or manual transcription.

Figure 23:
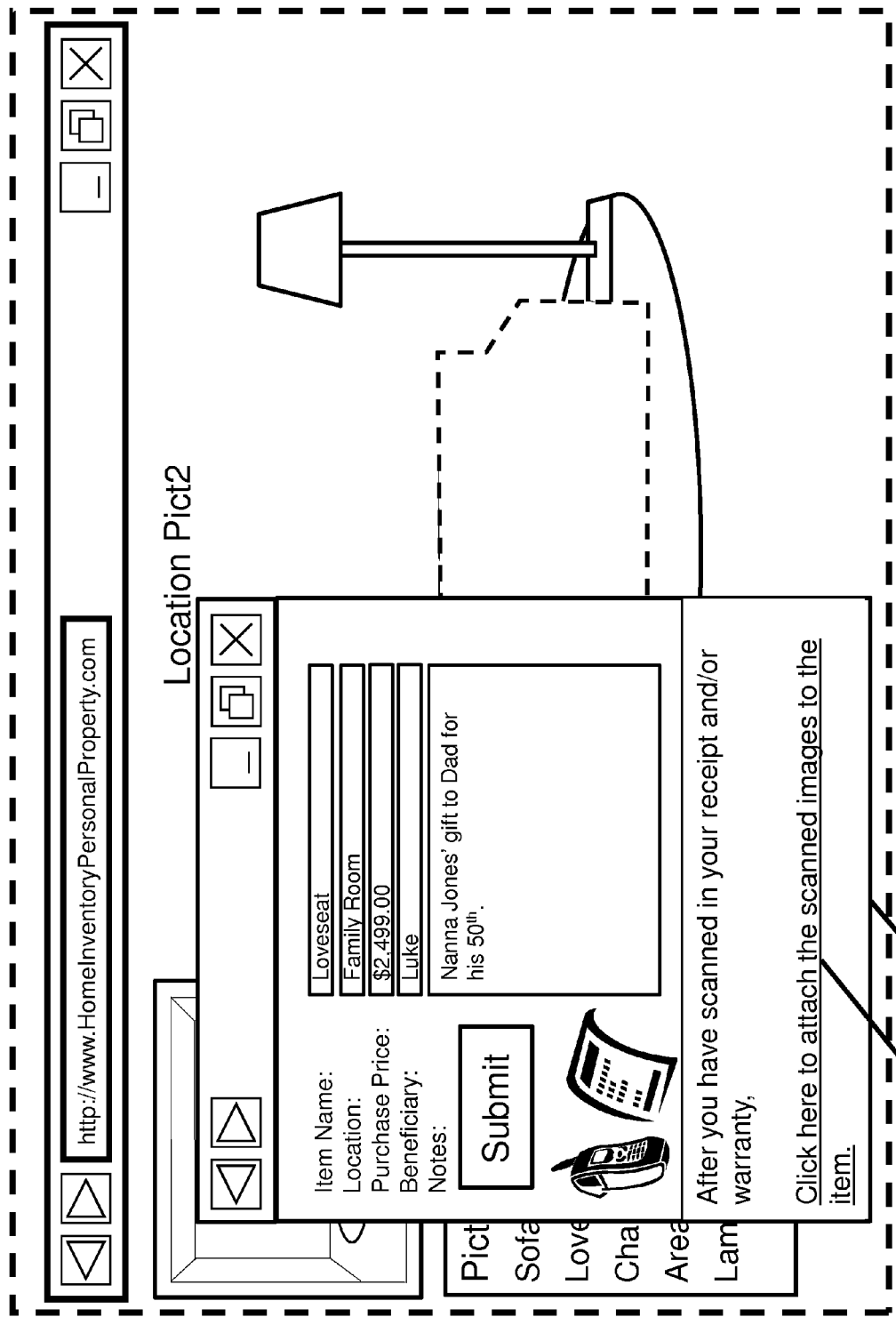
FIG. 23 illustrates an example web display enabling a user to attach additional information about an item in an image, including a scanned receipt or warranty contract.

FIG. 23 illustrates another example user interface 23000 presented via a browser (or other interface application). This example user interface enables a user to attach a scanned receipt or warranty to a selected item. This example web dialog box is presented in response to a user clicking on the receipt icon 22100 of FIG. 22.

The user is instructed to scan in the desired item and then to click link 23100. The user is next requested to specify the path name or browse to the scanned in stored receipt. In this example, the specified file is then downloaded across the data network 400 and stored in the user account database 700

Optionally, the user can invoke the program 800 on their mobile device and take a picture of the receipt/warranty information. The program 800 optionally prompts the user to enter the location and item name. Optionally, the Home Inventory system assigns a unique identifier to each location/item combination. Optionally, the user can enter this unique identifier before or after taking a picture of the receipt/warranty information. The receipt/warranty image(s) is transmitted to the web server 600 over the wireless network 300 and/or data network 400 and stored in the customer database 700.

In this example, the Home Inventory servers 500, 550, and 600 are optionally centralized at a given location, or distributed to a number of locations. The Home Inventory system 900 can be a standalone system (e.g., a Home Inventory system used by a number of service providers) or the Home Inventory system is integrated into a service provider's internal systems (e.g., those systems employed to provide users online information services). Optionally, the Home Inventory system is provided by a telecommunication carrier (e.g., Verizon) to service providers (e.g., Google or Intuit). Optionally, there are no charges to use the Home Inventory service. Optionally, the voice and/or data transactions between a user's mobile device and one or more Home Inventory servers are not charged to the user but to the service provider or telecommunication carrier. Optionally, the Home Inventory system 900 is connected to a data communication network 400 and a wireless network 300. The Home Inventory system interconnects with the wireless network 300 using telecommunication interfaces (e.g., SS7) and via data communication networks using a secure router subsystem and an SMS server subsystem which optionally serves as a mail relay to transmit and receive SMS and MMS messages via a Short Message Service Center (e.g., an SMSC operated by a network carrier). These subsystems of the Home Inventory system are optionally interconnected via a Local Area Network (LAN), a Private Wide Area Private Network (WAN), and/or a Public Wide Area Network (e.g., Internet).

The Home Inventory system in this example contains centralized databases and/or general-purpose storage areas, optionally including, but not limited to a customer/user database(s) 700. Optionally, the database(s) is not centralized and may be distributed geographically and/or over different systems. The database is optionally interconnected to the authentication system via a Local Area Network (LAN), a Private Wide Area Network (WAN), and/or a Public Wide Area Network (e.g., Internet).

Optionally, the Home Inventory system includes a presence management subsystem. Presence managers optionally authenticate and track an application's online presence and interact with a given application (e.g., a application hosted on a user's mobile phone) as information (e.g., passwords, location information, photos) is synchronized with the centralized databases to provide the user secure, reliable, and timely data transmissions and synchronized user interactions.

In this example embodiment and others, if the user changes their mobile device number (e.g. by purchasing a new phone from a new provider and don't port their device number), they contact their Home Inventory service provider via the web or phone and re-register their new phone identifier.

Example Embodiment

See FIGS. 2 and 3

FIGS. 2 and 3 depict a first example embodiment where a homeowner wants to create an inventory of her personal property. In this example, the homeowner accesses a Home Inventory service via the Internet from her personal computer, takes pictures of her personal property, downloads the pictures, and edits and/or organizes a presentation of her personal property.

State 1. The homeowner (user) accesses the Home Inventory (HI) service provider web site. In this example, the user browses to the home inventory web site using a personal computer 100 connected to data network 400. Optionally, any data networking capable device can be used by the user including for example, a mobile phone with data networking capabilities.

State 2. The HI service provider's web hosting server 600 receives the web page URL 4100 and presents the login/registration web page 4000 to the user (see FIG. 4).

State 3. With reference to FIG. 4, the user signals their desire to register a new account by clicking the pull down window control 43000 which opens registration window 5500 (see FIG. 5). The user next enters her name in the name field 5510, mobile phone number in the phone number field 5520, creates and enters a new password in the Password field 5530 and indicates they live in a single level structure by selecting the "no" radio button option 5540. Optionally, if the user resides in a multi-level structure, they enter the number of levels (excluding the basement) in field 5550. The user then clicks on the Download Now button 5560 to submit their information to the hosting web server 600.

State 4. The hosting web server 600 receives the information entered by the user and in this example creates a new customer account in the Home Inventory Database 700. In this example, one or more software programs 800 are next downloaded from the HI server 600, over the data network 400 and wireless network 300 and installed on the user's mobile device 200.

State 5. The web server 600 notifies the user over the data network 400 at the personal computer 100 that the software program download is complete and provides instructions to the user on how to activate the software program 800.

State 6. The user follows the provided instructions to activate the downloaded software program 800 on their mobile device 200. The software 800 acknowledges the activation by sending a message to the web server 600.

State 7. The application program 800 displays a welcome message 6000 and requests the user select their first location 6100 (places where personal property are located) to inventory, see FIG. 6 of an example mobile device user interface screen.

State 8. In this example, the user selects the bedroom as the first location to inventory. The user scrolls through the list of locations until the "bedroom" is highlighted and then the option is selected. Other alternative interfaces could be used for location selection. For example, the user could have spoken "bedroom" to select the bedroom location. Or, each location could have had a number assigned which could have been dialed by the user. The user then proceeds to the next user interface screen by selecting the "Next" button 6300. The updated user data can be incrementally sent at the end of each state (as shown by the dashed lines in FIG. 2) or buffered locally in the mobile phone 200 and sent as a batch message to the HI server 600 at the end of data collection (e.g. during state 12).

State 9. With reference to FIG. 7, since it is likely the user has more than one bedroom, the software program 800 requests that the user assign a reference identifier such as a name or number to the bedroom. In this example, the user assigns the name "Luke's Bedroom" 7100 to the bedroom. The user then proceeds to the next user interface screen by selecting the "Next" button 7300.

State 10. The user is then requested to stand in the center of the room and click "Next", see FIG. 8. In response to the user selection, the program 800 queries the mobile device/wireless network to determine the Global Positioning (GPS) coordinates of the location being inventoried. In this example, these coordinates are downloaded from the mobile device 200 over the wireless network 300, either at the end of this state or at the end of state 12. In another example, these coordinates are sent directly from the wireless network 300 and/or data network 400 to the HI server 600.

State 11. In this example, the user's mobile device has digital camera capabilities. The user is requested to photograph the contents of the location, see FIG. 9. Optionally, the user can take no pictures or as many pictures as they choose. In this example, the user interface increments 9100 with each picture of the bedroom. This is accomplished through a programmatic interface between the digital camera capabilities of the mobile device and the software program 800. Again, the images can be incrementally sent to the HI server 600 at the end of this state or at the end of state 12.

State 12. When the user is finished photographing the items in the room, she is requested to select the "Next" button 9300 as shown in FIG. 9. In this example, once the user has finished photographing the contents of the room and selected the "Next" button, all unsent data is transmitted from the mobile device 200 over the wireless network 300 through the data network 400 (which can optionally be the same network as the wireless network 300) to the network-based server 600 for storage in a secure customer account database 700.

State 13. The HI server 600 processes each photo image to separate individual items which are depicted by shape outlines 11310-11340 on an image item map rendition 11000 (see FIG. 11). The photo label 11200, initially created by the HI server, is shown at the top of the rendition.

Figure 12:
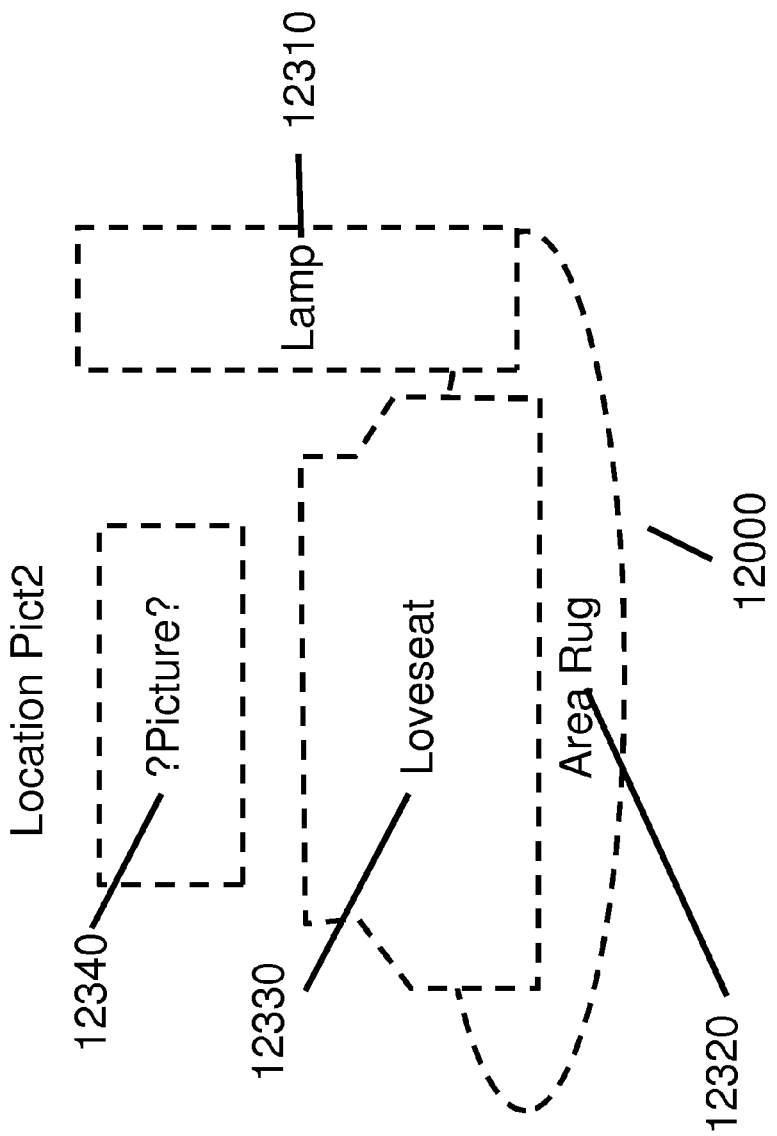
FIG. 12 illustrates an example photo item map with item labels generated by a Home Inventory system.

State 14. The HI server 600, in conjunction with the DSP servers 550, compares the item shape outlines to known item types to identify and label each item. The item labels 12310-12340 are added to the image item map 12000 as shown in FIG. 12.

State 15. Based on user preferences recorded in the customer's profile in the database 700, the item map is stored in the customer database 700 using item outlines in the rendition 12000 or alternatively is converted into a line drawing 13000 using standard line drawings of each individual item type 13310-13340 (see FIG. 13).

State 16. The program 800 displays a screen requesting the user select the next location to inventory, see FIG. 10. In addition, there is a menu selection 10350 whereby the user can indicate that they are finished.

The process states 8 through 16 are repeated until the user has completed their room by room inventory of personal items.

State 17. The user signals the Home Inventory system 900 that she has completed her inventory by entering the Finished 10350 menu selection.

State 18. Upon detection that the user has completed entering room and item information, the HI server 600 uses the GPS room locations to create and store a rendition of the floor plan of the user's residence. The server 600 initially plots the room center points 14000 on a grid 14100 as illustrated in FIG. 14. Recorded on the plot for each room is the room label 14210, an indicator 14220 of the location of the center point on the grid, and the x,y coordinates 14230 of the center point relative to the grid 0,0 origin 14100.

State 19. With reference to FIG. 15, the network-based server 600 next uses coordinate map 14000 to create a rendition of the homeowner's floor plan 15000. Simple editing tools are provided for the user to change the labels attached to the rooms in the floor plan and to resize the room shapes.

State 20. In the event of multiple levels, the network-based server 600 optionally creates side views 16000 of the residence structure to facilitate user navigation. An example Home Inventory generated side view is shown in FIG. 16.

State 21. After completing the image capture, the user can access the home inventory service provider web site and login to view the downloaded images and the floor plan created by the home inventory system (see FIG. 4).

The homeowner (user) accesses the Home Inventory (HI) service 900 by browsing to the home inventory web site using a personal computer 100 connected to data network 400. The browser passes the web site URL 4100 to the HI web hosting server 600 to initiate the process.

State 22. The web server 600 presents the login/registration web page 4000 to the user (see FIG. 4).

State 23. With reference to FIG. 4, the user signals their desire to login to their account by clicking the pull down window control 4200 which opens login window 17300 (see FIG. 17). The user next enters her mobile phone number in the phone number field 17310 and enters her password in the Password field 17320. The user then clicks on the Sign In button 17330 to submit their information to the hosting web server 600.

State 24. The hosting web server 600 receives the information entered by the user and opens the customer's account in the Home Inventory Database 700. The server 600 then sends a web page 18000 (see FIG. 18) to the user's terminal 100 displaying the floor plan of the user's residence to allow the user to navigate through their inventory. This includes a side view 18100, a top view of the ground level 18200 of the residence, and a link 18300 to select alternate views. Additional navigation controls are provided to allow the user to select different floor plan levels (e.g. by clicking link 18110 to view the basement) and to focus on an individual room (for example by clicking link 18210 to view the items in Luke's Bedroom).

State 25. In this example, after logging in, the user clicks link 18210 in FIG. 18 to select "Luke's" bedroom to review and edit the contents of the location (or to modify the label assigned to that location).

State 26. FIG. 19 is an example web presentation display 19000 of the information stored in association with Luke's bedroom sent to the user's browser by the HI server 600. The presentation is in a tabbed format with "Luke's Bedroom" the current open tab 19100. Optionally, other tabs across the top include all of the locations (depending upon the number of locations), or the higher-level abstraction of the different floor levels.

State 27. In this example, the user decides to view a list of individual items within one of the camera images. She clicks the maximize[+]/minimize[−] button 19300 associated with the image "Location Pict2". This causes the photo item list to be displayed and the button 19300 to enter the minimize[−] state. Each photo item list can be similarly opened (maximized) and closed (minimized). The user next requests that the photo and associated item information be visually displayed by double clicking the image identifier "location Pict2" 19200. The request is transmitted back to the network-based server 600 over the data network 400.

State 28. The network-based server 600 retrieves the selected image from the customer database 700 and displays the image on the user's data terminal 100. An illustrative web display 21000 is shown in FIG. 21.

State 29. The user can now examine and modify the items identified in the selected photo. A thumbnail 21100 of the original photo, the photo label/identifier 21200, a line drawing 21300 of the identified photo items, and a pallet 21400 of line drawing item types are displayed. The user next selects a single item to view by double clicking the associated item label (for example, item label 21335 to select the loveseat). This user request is once again sent on to the HI web server 600 for processing.

State 30. Upon reception of the above user request, the web server 600 queries the database 700 to retrieve the requested item parameters which are returned to the user's browser and displayed 22000 as illustrated in FIG. 22.

State 31. In this example, the user describes in further detail the previously selected item—the loveseat 21335 shown in FIG. 21. This is accomplished by updating fields in a pop-up web form 22000 as illustrated by way of example in FIG. 22.

The pop-up web form 22000 prompts the user to enter a structured set of item information (e.g., label or title for the item 22010, the purchase price 22030, beneficiary 22040, etc.). In this example, there is also a note field 22050 for general information to be detailed by the user about the selected item. When the user has completed her updates, she clicks the Submit button 22300. This causes the browser to forward the filled in form fields to the web server 600.

State 32. The HI web server 600 updates the database 700 with the new item information.

State 33. The user signals the web server 600 that she is done managing her home inventory information by closing all associated HI web pages.

State 34. Upon detection that the user has closed their HI web pages, the web server 600 cleans up any incomplete open records and logs the user account out of the system.

This example embodiment has illustrated methods and systems for providing the user with an online inventory of their personal property.

In addition, it should be understood that certain variations and modifications of the systems and processes described herein would suggest themselves to one of ordinary skill in the art. The scope of the present invention is not to be limited by the illustrations or the foregoing descriptions thereof.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of recording an inventory of household items, comprising:
   providing an inventory software program associated with an inventory system, to a mobile device associated with a first user, wherein some or all of the inventory software program is at least in part:
   preinstalled on the mobile device of the first user,
   transmitted to the mobile device of the first user, or,
   preinstalled on the mobile device and transmitted to the mobile device of the first user;
   partly causing by the inventory system, an image capture instruction to be presented to the first user;
   receiving at the inventory system from the first user's mobile device, a one or more images of a one or more household items;
   receiving at the inventory system, a one or more audio communications from the first user;
   interpreting by the inventory system, the one or more audio communications from the first user using speech recognition to determine a one or more room type identifiers;
   storing by the inventory system in computer readable memory, the images received from the first user's mobile device that have an associated room type identifier and their associated room type identifier;
   automatically identifying by the inventory system, a one or more items in at least one of the images using image processing based at least in part on a dictionary of common household items associated with a room type of the associated room type identifier;
   storing by the inventory system in computer readable memory, the item identifiers in association with the images;
   providing a user interface by the inventory system via which the images, the room type identifiers associated with these images, and the item identifiers within these images can be (a) viewed, (b) edited, (c) searched or any combination of (a), (b), and (c).

2. The method as defined in claim 1, the method further comprising: determining by the inventory system an approximate appraised value or an approximate replacement cost of a one or more of the identified one or more items.

3. The method as defined in claim 1, wherein the audio communications from the first user is a spoken yes response or a spoken no response.

4. The method as defined in claim 1, wherein the audio communications from the first user is a spoken identifier for the room type identifier.

5. The method as defined in claim 1, wherein the room type is a bedroom, a kitchen, or a bathroom.

6. The method as defined in claim 1, wherein the user interface search accepts search terms including a one or more identified items, a one or more room type identifiers, or any combination of the one or more identified items and the one or more room type identifiers.

7. The method as defined in claim 1, the method further comprising: storing at the inventory system in computer readable memory, the images received from the first user's mobile device that do not have an associated room type identifier.

8. The method as defined in claim 1, the method further comprising: if the room type identifier is not assigned, identifying by the inventory system, a one or more items in at least one of the images using image processing based at least in part on a secondary dictionary.

9. The method as defined in claim 8, wherein the secondary dictionary includes jewelry items or art items.

10. A method of recording an inventory of household items, comprising:
    providing a household inventory software program associated with an inventory system, to a mobile device associated with a first user, wherein some or all of the inventory software program is at least in part:
        preinstalled on the mobile device of the first user,
        transmitted to the mobile device of the first user, or,
        preinstalled on the mobile device and transmitted to the mobile device of the first user;
    partly causing by the inventory system, an image capture instruction to be presented to the first user;
    receiving at the inventory system from the first user's mobile device, a one or more images of a one or more household items;
    automatically assigning by the inventory system, for a one or more of the received images of household items, (a) a room category, (b) a one or more item labels, or (a) and (b) using:
        speech recognition based at least in part on a one or more audio communications from the first user, or, item recognition based at least in part on a dictionary of common household items;
    storing by the inventory system in computer readable memory, the images of the one or more items of the household of the first user received from the first user's mobile device, the assigned room categories associated with these images, and the assigned item labels associated with these images;
    providing a user interface by the inventory system via which the images of the one or more items of the household of the first user, the associated room categories, and the associated item labels can be (c) viewed, (d) edited, (e) searched or any combination of (c), (d), and (e).

11. The method as defined in claim 10, wherein the inventory system is the inventory software program.

12. The method as defined in claim 10, wherein the inventory system is at least in part an Internet connected server and the inventory software program.

13. The method as defined in claim 10, wherein the room category is a bedroom, a kitchen, or a bathroom.

14. The method as defined in claim 10, wherein the audio communications from the first user is a spoken yes response or a spoken no response.

15. The method as defined in claim 10, wherein the audio communications from the first user is a spoken identifier for the room category.

16. The method as defined in claim 10, wherein the image is one or more pictures, one or more videos, or any combination of pictures and videos.

17. A method of recording an inventory of household items, comprising:
    providing an inventory software program associated with an inventory system, to a mobile device associated with a first user, wherein some or all of the inventory software program is at least in part:
        preinstalled on the mobile device of the first user,
        transmitted to the mobile device of the first user, or,
        preinstalled on the mobile device and transmitted to the mobile device of the first user;
    partly causing by the inventory system, an image capture instruction to be presented to the first user;
    receiving at the inventory system from the first user's mobile device, a one or more images of a one or more household items;
    automatically identifying by the inventory system, a one or more items in at least one of the images using image processing;
    converting audio to text using speech recognition for an audio communication received from the first user wherein the audio communication is associated with a one or more of the one or more identified items;
    storing by the inventory system in computer readable memory, the images received from the first user's mobile device and the items identifiers associated with the images;
    providing a user interface by the inventory system via which the images, the associated item identifiers, and the converted text associated with the identified items can be (a) viewed, (b) edited, (c) searched or any combination of (a), (b), and (c).

18. The method as defined in claim 17, wherein the audio communication is a plurality of audio communications.

19. The method as defined in claim 17, wherein the audio communication is a notation spoken by the first user describing a make and a model number of the associated item.

20. The method as defined in claim 17, the method further comprising: providing via the user interface a control via which the first user can associate (d) purchase receipts, (e) warrantees, (f) notes, or any combination of (d), (e), and (f) with the stored identified items.

21. A system comprising:
    at least one computing device;
    program instructions stored in non-transitory memory, that when executed by the at least one computing device, are configured to cause the system to perform operations comprising;
    providing an inventory software program, to a mobile device associated with a first user, wherein some or all of the inventory software program is at least in part:
        preinstalled on the mobile device of the first user,
        transmitted to the mobile device of the first user, or,
        preinstalled on the mobile device and transmitted to the mobile device of the first user;
    partly causing an image capture instruction to be presented to the first user;
    receiving from the first user's mobile device, a one or more images of a one or more household items;

automatically identifying a one or more items in at least one of the images using image processing;

converting audio to text using speech recognition for an audio communication received from the first user wherein the audio communication is associated with a one or more of the one or more identified items;

storing the images received from the first user's mobile device and the item identifiers associated with the images;

providing a user interface via which the images, the associated item identifiers, and the converted text associated with the identified items can be (a) viewed, (b) edited, (c) searched or any combination of (a), (b), and (c).

* * * * *